(12) United States Patent
Pein et al.

(10) Patent No.: US 10,653,158 B2
(45) Date of Patent: May 19, 2020

(54) TRANSPORTING STATION AND METHOD FOR TRANSPORTING FISH IN A TRANSPORTING DIRECTION, WHICH IS TRANSVERSE TO THEIR LONGITUDINAL EXTENT, AND FISH-PROCESSING MACHINE HAVING SUCH A TRANSPORTING STATION

(71) Applicant: NORDISCHER MASCHINENBAU RUD. BAADER GMBH + CO. KG, Luebeck (DE)

(72) Inventors: Roland Pein, Herrnburg (DE); Joerg Holtz, Luebeck (DE)

(73) Assignee: NORDISCHER MASCHINENBAU RUD. BAADER GMBH + CO. KG, Lubeck (DE)

( * ) Notice: Subject to any disclaimer, the term of this patent is extended or adjusted under 35 U.S.C. 154(b) by 0 days.

(21) Appl. No.: 16/309,677

(22) PCT Filed: May 29, 2017

(86) PCT No.: PCT/EP2017/062850
§ 371 (c)(1),
(2) Date: Dec. 13, 2018

(87) PCT Pub. No.: WO2017/215901
PCT Pub. Date: Dec. 21, 2017

(65) Prior Publication Data
US 2019/0124935 A1      May 2, 2019

(30) Foreign Application Priority Data
Jun. 14, 2016   (DE) .................. 10 2016 110 898

(51) Int. Cl.
  A22C 25/08     (2006.01)
  A22B 7/00      (2006.01)
  A22C 25/12     (2006.01)

(52) U.S. Cl.
  CPC .............. *A22C 25/08* (2013.01); *A22B 7/002* (2013.01); *A22B 7/005* (2013.01); *A22C 25/12* (2013.01)

(58) Field of Classification Search
  CPC .......... A22B 27/00; A22B 7/001; A22B 7/002
  (Continued)

(56) References Cited

U.S. PATENT DOCUMENTS 2,961,697 A    11/1960  Schlichting
3,680,174 A    8/1972   Dohrendorf
(Continued)

FOREIGN PATENT DOCUMENTS

DE    19 27 916    12/1970
JP    S60-98935     6/1985
(Continued)

OTHER PUBLICATIONS

PCT Search Report and Written Opinion issued in PCT/EP2017/062850.
(Continued)

*Primary Examiner* — Richard T Price, Jr.
(74) *Attorney, Agent, or Firm* — Greenblum & Bernstein, P.L.C.

(57) ABSTRACT

The invention relates to a transporting station (10), designed and configured for transporting fish transverse to their longitudinal extent in a transport direction T, comprising a conveying device (11) for transporting individual, separated fish in a lying position along a transport path $T_L$ from an entry region E of the conveying device (11) to an exit region A of the conveying device (11), wherein the conveying
(Continued)

device (11) comprises a rotationally driven transport element (12) which is characterised in that the conveying device (11) is assigned a change-over device (13) which is designed and configured and is in operative connection with the conveying device (11), in such a manner that the fish can be transferred automatically from the lying position on the transport path $T_L$ of the conveying device (11) into a suspended position on a transport path $T_H$ of the change-over device (13). The invention is also concerned with a fish processing machine (47) having such a transporting station (10), and with a corresponding method.

38 Claims, 10 Drawing Sheets

(58) Field of Classification Search
USPC .............................. 452/177–179, 182, 183
See application file for complete search history.

(56) References Cited

U.S. PATENT DOCUMENTS

| | | |
|---|---|---|
| RE29,432 E | 10/1977 | Leander |
| 7,828,635 B2* | 11/2010 | Paulsohn ............. A22C 25/147 452/116 |
| 8,092,283 B2* | 1/2012 | Hansen ................. A22C 25/08 452/121 |
| 8,118,647 B2* | 2/2012 | Mikajiri ................ A22C 25/14 452/149 |
| 8,512,106 B2* | 8/2013 | Ryan .................... A22C 25/147 452/121 |
| 8,986,077 B1* | 3/2015 | Ryan .................... A22C 25/145 452/57 |
| 2005/0009463 A1 | 1/2005 | Grosseholz |

FOREIGN PATENT DOCUMENTS

| | | |
|---|---|---|
| JP | S62-208230 | 9/1987 |
| JP | 2002-034441 | 2/2002 |

OTHER PUBLICATIONS

Chilean Office Action issued in Application No. 201803616 (9 pages).

* cited by examiner

TRANSPORTING STATION AND METHOD FOR TRANSPORTING FISH IN A TRANSPORTING DIRECTION, WHICH IS TRANSVERSE TO THEIR LONGITUDINAL EXTENT, AND FISH-PROCESSING MACHINE HAVING SUCH A TRANSPORTING STATION

CROSS-REFERENCE TO RELATED APPLICATIONS

The instant application is a US National stage of PCT International Application No. PCT/EP2017/062850 filed May 29, 2017 which claims priority to German Application No. 10 2016 110 898.7 filed on Jun. 14, 2016.

BACKGROUND OF THE INVENTION

1. Field of the Invention

The invention relates to a transporting station, designed and configured for transporting fish transverse to their longitudinal extent in a transport direction T, comprising a conveying device for transporting individual, separated fish in a lying position along a transport path $T_L$ from an entry region E of the conveying device to an exit region A of the conveying device, wherein the conveying device comprises a rotationally driven transport element.

The invention further relates to a fish processing machine, comprising a transporting station for transporting the fish into the region of a fish processing station as well as at least one fish processing station.

The invention further relates to a method for transporting fish transverse to their longitudinal extent in a transport direction T, comprising the steps: individually depositing fish on a rotationally driven transport element of a conveying device for transporting the fish in a lying position along a transport path $T_L$ and transporting the fish along the transport path $T_L$ from an entry region E of the conveying device to an exit region A of the conveying device.

2. Discussion of Background Information

Such transporting stations, fish processing machines and methods are used in the fish processing industry in order to process fish automatically, in that the fish, in particular salmon and other salmonidae, but also other fish species, such as whiting, are transported into the effective region of individual processing stations by means of the transporting station. For processing the fish, for example when performing the ventral incision and in particular when performing the heading cut, that is when severing the head from the body, precise positioning of the fish in relation to the relevant tool of the processing station is very important in order to achieve an accurate incision and in particular a high yield. Using the heading cut as an example, it is important to sever the head from the body as yield-efficiently as possible, i.e. to sever the head in such a way that as much consumable flesh mass as possible remains on the body.

Transporting stations are known in which the fish are transported in a lying position transverse to their longitudinal extent. In other words, during transport the fish lie on the transport element in the back or side position. U.S. Pat. No. 2,961,697 describes such a transporting station in which the fish lie on their side on the flank of their bodies. This type of transport is easy to handle as the fish can be positioned on the transport element manually or automatically. However, due to the side position of the fish, the axis of symmetry/plane of symmetry (referred to in the following as the axis of symmetry) of the fish shifts. In other words, in the said position, the fish are not lying symmetrically on the transport element. In this case, the axis of symmetry describes the exact central position of each fish.

If a cutting tool, for example a pair of knives for performing a V-cut for heading the fish, now engages in the fish lying horizontally and asymmetrically, the two sides of the fish are cut unevenly. Due to the "skew position" of the fish, the knife pair cannot separate the head from the body without yield loss. This effect occurs particularly when slaughtered fish with opened abdominal cavities are transported lying on the flank of their bodies, i.e. on the side and abdomen- or spine-first. Processing of fish lying on their sides, in particular heading of the fish, is also a disadvantage for another reason. The uneven weight distribution in relation to the axis of symmetry between the two halves of the body of the fish can lead to an inadequate cutting result due to the undefined position of the fish. Orientation of the horizontal fish into a defined position in relation to the axis of symmetry cannot be achieved or can only be achieved with considerable technical effort due to product-dependent and/or quality-dependent and/or physical factors. For example, the fish species is mentioned as a product-dependent factor, the condition before or after rigor mortis as a quality-dependent factor and the dimension of the fish, for example, as a physical factor.

Transporting stations in which the fish are transported suspended transverse to their longitudinal extent are known, for example, from DE 1 927 916. This document discloses a transporting station in which the fish are suspended manually on the transport element underneath their pectoral fins such that the fish can be fed to the or each processing station in the suspended position with the head pointing upwards. Thus, the cutting and yield result depend significantly from the precision with which the operator suspends the fish. For heading of the fish, it has to be turned again manually about its longitudinal axis into the correct cutting position. Manual loading of such transporting stations with fish on the one hand, and manual orientation of the fish for the heading cut on the other hand, lead to undefined orientation of the fish on the one hand and to high physical stress of the operators on the other hand. In addition, the automation of such work steps on the one hand, and fixing of the fish in the suspended position on the other hand, requires a considerable effort in terms of design. Such transporting stations therefore have various disadvantages which is why transporting stations with suspended transport of the fish, head upwards, have not prevailed over transport in a lying position despite the improved symmetrical position of the fish which is improved by comparison.

As already mentioned, transportation of the fish and their symmetrical orientation during transport are extremely important for processing of the fish. All the solutions known from prior art have problems concerning symmetrical orientation of the fish with the result that yield losses occur during processing of the fish.

SUMMARY OF THE INVENTION

Thus, the object of the invention is to propose a structurally simple transporting station and a method which ensures yield-efficient and quality-independent processing of the fish. The object further consists of proposing a corresponding fish processing machine.

This object is achieved by a transporting station having the features referred to hereinbefore in that the conveying device is assigned a change-over device which is designed and configured and is in operative connection with the conveying device, in such a manner that the fish can be transferred automatically from the lying position on the transport path $T_L$ of the conveying device into a suspended position on a transport path $T_H$ of the change-over device. Due to the automatically executable position change of the fish, namely taking the lying fish from transport path $T_L$ and transferring them to the suspended position on transport path $T_H$, after the transfer each fish is transported, independently of its qualitative condition, in a defined and above all symmetrical position, such that subsequent processing steps can be performed with high precision on the one hand, and reproducibly as well as yield-efficiently on the other hand. The advantages of known transporting stations, namely the ease of handling and simple structural design of horizontal transport transverse to the longitudinal extent on the one hand, and optimised centring of the fish during suspended transport transverse to the longitudinal extent on the other hand, are achieved by way of the embodiment according to the invention. This creates the basis for particularly yield-efficient processing of the fish.

An especially preferred embodiment is characterised in that the change-over device comprises a suspended conveying device, arranged above the conveying device for horizontal transport of the fish, for transporting the fish suspended along a transport path $T_H$ and a device for transferring the fish, namely for removing the fish from the conveying device for transport of the fish in a lying position and for holding the fish during suspended transport along the transport path $T_H$. This creates a structurally simple transporting station which combines ease of handling in conjunction with transport of the fish in a lying position and precise orientation of the fish in conjunction with suspended transport.

Advantageously, the suspended conveying device extends beyond the conveying device in transport direction T, wherein the change-over area for the fish from the conveying device to the suspended conveying device is formed in the overlapping region of conveying device and suspended conveying device in transport direction T upstream of the exit region A of the conveying device. In other words, the suspended conveying device starts above the conveying device such that the fish are located at least temporarily between the lower conveying element and the suspended conveying device situated above it. Transfer of the fish from the conveying device to the suspended conveying device can reliably take place in this change-over area. However, since the suspended conveying device extends beyond the conveying device in transport direction T, the transport path $T_H$ accordingly leads beyond the transport path $T_L$, a free space arises in transport direction T downstream of the conveying device below the suspended conveying device into which the fish suspended on the suspended conveying device can pivot in order to orientate themselves symmetrically.

A preferred development is characterised in that the suspended conveying device comprises a rotationally driven transport element, on which the device for removing and holding the fish is arranged, wherein the device comprises at least one gripping device for gripping the head of a fish. Due to the rotational transport elements of the suspended conveying device, the gripping device regularly passes through the change-over area such that the fish transported into the change-over area by the conveying device can be removed from said conveying device. The suspended conveying device and the conveying device come into operative connection with each other in the change-over area due to the device for removing and holding the fish. In other words, the conveying device and the suspended conveying device act together in the change-over area in that the conveying device then provides the fish in synchronisation when the device for removing and holding passes through the change-over area. The fact that the fish is gripped by the head ensures particularly stable and precise orientation of the fish in the symmetrical position.

Advantageously, the transport element of the suspended conveying device is a transport chain rotationally driven about a deflecting and/or drive body, whose central and/or rotational axes $R_1$ are oriented horizontal and transverse to the transport direction T, in such a manner that the device for removing and holding the fish is moved in a vertical plane $E_V$ and has the smallest distance to the transport element of the conveying device in the change-over area. The transport chain is guided about at least two deflecting and/or drive bodies, wherein one deflecting and/or drive body is arranged above the conveying device and the other deflecting and/or drive body is arranged downstream of the conveying device in transport direction T. Due to the deflecting and/or drive body arranged above the conveying device, the device for gripping in the vertical plane $E_V$ descends from above in the direction of the conveying device at the beginning of the change-over area such that a collision with the fish being fed in horizontally in the transport plane $E_H$ is prevented.

An advantageous embodiment is characterised in that the device for removing and holding the fish comprises a plurality of gripping device rotating with the transport element of the suspended conveying device, wherein each gripping device has two gripping elements, of which at least one gripping element is provided with at least one spike directed towards the fish to be gripped. Due to the gripping elements on the one hand and the at least one spike on the other hand, a positive and rigid connection can be established to the fish head in a simple and effective manner such that the fish can be held safely and stably in the pick-up position.

Expediently, a first gripping element comprises a gripping arm with a torsionally fixed and rigid spike body arranged on the free end and the second gripping element comprises a gripping arm with a rotatably supported spike body arranged on the free end, wherein the gripping arms are designed and configured to be movable automatically towards each other into a holding position and away from each other into a release position and vice versa in the vertical plane $E_V$ and in the horizontal position the central and/or rotational axes M of the spike bodies are oriented horizontally and parallel to the transport direction T. The two spike bodies directed towards each other at the end of the movable gripping arms form a kind of pincers, by way of which each fish can be safely picked up and held. Due to the fact that at least one spike body is rotatably supported, on leaving the conveying device the fish can swing or pivot from the horizontal position into a vertical position in a simple manner. The ability of the gripping arms to move towards each other and away from each other enables a fish to be reliably picked up between the gripping arms and the spike bodies arranged thereon by pivoting them apart and enables the fish to be reliably fixed by pivoting them together. Finally, the fish "thread" from below into the open gripping arms in the change-over area so as to then be held in a defined position due to closing of the gripping arms. The central and/or rotational axes oriented horizontally and parallel to the transport direction T in the holding position ensure that the fish is located in a symmetrical position when suspended on the suspended conveying device.

A preferred development is characterised in that a first spike body of the first gripping element has a spike completely penetrating the head of a fish, said spike entering the second spike body in the holding position, which is why the second spike body of the second gripping element has an opening for receiving the spike of the first spike body, wherein at least two spikes penetrating the head are arranged around the opening of the second spike body. Due to this design, the gripping device has a secure hold of the fish such that even fish with a high weight are reliably and accurately held in position, particularly when swinging down after leaving the conveying device.

Advantageously, in the holding position, the only and central spike of the first spike body forms the pivot axis S oriented horizontally and parallel to the transport direction T for each fish such that the fish, after swinging into the suspended position, can stabilise in the symmetrical position.

A preferred embodiment of the invention is characterised in that the transport element is designed and configured for lying transport of the fish abdomen- or spine-first in transport direction T and comprises a conveyor belt which has webs running transverse to the transport direction T and extending perpendicular to the transport plane $E_H$ and rotating with the conveyor belt for subdividing said conveyor belt into individual sections for each receiving a single fish, wherein the webs only extend in each case over part of the width of the conveyor belt. These webs, which are also called cleats, form a stop for the fish on their ventral side or preferably on the dorsal side when they are placed on the conveyor belt such that in the latter case the fish are transported with the spine abutting the web and abdomen-first. As the webs only extend across a portion of the width of the conveyor belt, the web is preferably recessed in the head region of the fish, thus ending with a gap from the side edge of the conveyor belt on which the head of the fish is placed, space is provided for engagement of the gripping device. In other words, a free corridor is created in the edge region of the conveyor belt which ensures collision-free gripping of the fish.

Especially preferably, on at least one side in transport direction T, a fixed abutment element for positioning each fish in its longitudinal orientation transverse to the transport direction T is assigned to the conveyor belt, wherein the abutment element is designed and configured for positioning the fish head in a defined position. This abutment element limits the conveyor belt laterally, that is on the side on which the fish lie with their head. On being placed onto the conveyor belt, the fish strike against the abutment element with the foremost tip of the mouth such that the fish lie with their head in the corridor formed between the webs and the abutment element.

In an advantageous development, the conveyor belt, which is formed from an upper run as transport run and a lower run as return run, is guided about at least three deflecting and/or drive bodies, whose central and/or rotational axes $R_2$ are oriented horizontal and transverse to the transport direction T, and in the region of the upper run said conveyor belt has a first section I which spans a transport plane $E_{H1}$ and a second section II following in transport direction T which spans a transport plane $E_{H2}$, wherein the transport plane $E_{H2}$ is situated above the transport plane $E_{H1}$ such that the fish are transported by the conveyor belt on an incline from the transport plane $E_{H1}$ to the transport plane $E_{H2}$ via a connecting section III. In other words, the transport run, on which the fish lie during transport, is initially oriented horizontally in the transport plane $E_{H1}$ from the entry region E to the exit region A, then inclined in transport direction T and subsequently runs horizontally again in the transport plane $E_{H2}$. The region in which the transport run passes from the rising connecting section into the section of the transport plane $E_{H2}$, is located vertically below the deflecting and/or drive body of the suspended conveying device. This embodiment significantly simplifies "threading" of the fish in between the gripping elements. The gripping elements coming from above from the vertical plane $E_V$ meet the fish transported obliquely from bottom to top with open gripping arms. In the region of the smallest gap between the gripping device and the transport run at the beginning of the change-over area, the fish is then positioned precisely between both spike bodies of the gripping element. This ensures safe and collision-free positioning of the fish in the change-over area.

In an especially preferred development, the conveyor belt is designed to be height-adjustable at least in the change-over area. In other words, the section of the transport run forming the transport plane $E_{H2}$ is adjustable in height. This makes it possible to vary the distance between the transport run and the gripping device, thus also the distance between fish head and gripping means, in order to always ensure that the fish is gripped in the region of the axis of symmetry, regardless of the thickness of the fish head. In other words, each fish can be gripped individually in its axis of symmetry which leads to an optimally oriented suspended position. In addition to the height compensation for fish of different sizes, the height adjustment also ensures compensation for the inclination of the axis of symmetry, which arises depending on the body due to the lateral position of the fish on the transport run.

An embodiment which is characterised in that the section of the conveyor belt spanning the transport plane $E_{H2}$ is designed to be pivotable by way of a drive about a pivot axis C, which is oriented horizontal and transverse to the transport direction T, has proven to be particularly advantageous. By pivoting about the pivot axis C, which preferably lies in the region of the transition from the connecting section of the transport run on which the section of the transport run spanning the transport plane $E_{H2}$ lies and particularly preferably corresponds to the central and/or rotational axis $R_2$ of a deflecting and/or drive body for the transport chain, even small pivoting movements of a few degrees lead to the desired compensation effect in respect of the distance between the transport run and the gripping device.

A preferred development is characterised in that the transporting station comprises a measuring device for recording and/or determining fish-size-relevant data, in particular for determining the thickness of the head perpendicular to the transport plane $E_H$ and the width of the head in the transport plane $E_H$ in transport direction T, wherein the measuring device is arranged upstream of the change-over area in transport direction T. The measuring device is designed and configured, on the one hand, to detect the height of the head starting from the support surface up to the highest point of the head, in order to determine the axis of symmetry therefrom. On the other hand, the measuring device is designed and configured to detect the width of the head, that is the distance from the underside of the lower jaw up to the upper side of the upper jaw. Optionally, the distance from the underside of the lower jaw up to the web on which the fish rests with its spine can also be detected. This makes it possible to precisely control gripping of the fish in its relevant axis of symmetry.

Expediently, the measuring device is arranged fixedly above the conveying device and comprises a measuring vane which is designed and arranged for deflection by the fish head. More precisely, the measuring device is arranged above the section of the transport run spanning the transport plane $E_{H1}$. Due to the position of the fish head on the abutment element, transport of the fish abdomen-first in transport direction T and the distance between the webs of the conveyor belt and the abutment element, the measuring vane inevitably meets the fish collision-free in the corridor and can thus perform the necessary measuring steps in a safe and easy manner and supply the information obtained.

Advantageously, in the region of the measuring device, namely directly below the measuring device, arranged on the abutment element is a fixed take-up element which is designed and configured to take up the fish with its head, in such a manner that the upper sliding surface of the take-up element directed towards the measuring device, which is oriented parallel to the transport plane $E_{H1}$, forms the reference plane for the measuring device when determining the thickness of the fish head and specifying the position of the axis of symmetry of the fish head. The take-up element, which is located above the conveyor belt such that the conveyor belt can be moved through underneath the take-up element, has a ramp-like slope inclined in transport direction T which merges into the horizontal sliding surface. The free/hollow space underneath the fish head can be filled in by the take-up element such that the fish head is located below the measuring device with an axis of symmetry oriented as horizontally as possible. In addition, a take-up element can compensate irregularities with regard to the position of the head, due, for example, to the fish being placed incorrectly or inaccurately, due to the origin of the fish, the size of the fish, the manner of killing, the type of intermediate storage or other factors.

Especially preferably, a take-up element, which is designed and configured to take up the fish with its head, is also arranged fixedly on the abutment element in the change-over area, wherein the two take-up elements are identically designed in respect of their height starting from the surface of the conveyor belt up to the upper sliding surface of the take-up element, such that the position of the axis of symmetry of the fish head determined by the measuring device is reproducible in the change-over area when combined with the height adjustment of the conveyor belt. Thus, in the region of the gripping device, which is arranged above the change-over area or is positioned for gripping, the same circumstances or boundary conditions are created with regard to positioning as at the measuring device. In other words, the take-up element in the change-over area makes it possible when gripping to bring the fish into the optimum gripping position in relation to the gripping device, in order to achieve optimum orientation of the fish so that said gripping device can engage in the position of the axis of symmetry determined by the measuring device.

In an especially advantageous development, the transporting station comprises a control device, wherein the or each drive for the conveyor belt of the conveying device and/or the or each drive for the height adjustment of the conveyor belt of the conveying device and/or the measuring device are connected to the control device. Using the control device and the connection of said components, the fish can be transported automatically and precisely into the optimum gripping position in that the fish is measured individually and, based on the measured values, the transport speed of the fish on the conveyor belt and the height adjustment in the change-over area of the transport run are controllable. The controller of the drives for the conveyor belt of the conveying device can be used to vary the transport speed, e.g. to prevent the webs of the conveyor belt from colliding with the fish in the tilting region. Speed adjustment of the conveyor belt also plays an important role in positioning the fish head below the gripping device. The conveying speed can be adjusted as a function of the width of the fish head to ensure that the spike body, which is rotatably supported, first engages on the fish head in order to form a counter bearing for the rigid spike body which penetrates the fish head completely. This can effectively prevent the head from twisting on being gripped.

Advantageously, the distance of the measuring device from the abutment element transverse to the transport direction T, i.e. the measuring point, corresponds to the distance from the central and/or rotational axes M of the spike bodies in the holding position to the abutment element transverse to the transport direction T. In other words, the distance a between the foremost tip of the fish mouth resting on the abutment element and the central contact point of the measuring vane is equal to the distance b between the foremost tip of the fish mouth resting on the abutment element and the meeting point of the rigid spike body having the one central spike.

An expedient development provides that an impact element, directed substantially vertically downwards from the transport plane $E_{H2}$, whose impact surface is oriented in the direction of the suspended fish, is arranged in transport direction T, downstream of the conveying device for horizontal transport of the fish and alongside the transport path $T_H$ of the suspended conveying device. The impact element absorbs the energy of the fish swinging downwards to support and in particular to accelerate stabilisation of the swinging fish in order to settle the fish in its suspended position.

The object is also achieved by a fish processing machine having the features referred to hereinbefore in that the transporting station is designed and configured according to one or more aspects of the invention, wherein the or each fish processing station is arranged in the region of the suspended position of the fish. The advantages arising from this have already been described in connection with the transporting station, which is why reference will be made to the relevant passages to avoid repetitions. It is crucial that the fish are in the suspended position before reaching the first fish processing station to ensure optimised orientation of the fish, particularly in respect of their axis of symmetry, because in this position the relevant processing steps can be performed with the necessary precision on the one hand, and maximum yield on the other hand.

The fish processing machine is preferably designed and configured for heading unslaughtered and/or slaughtered fish with opened abdominal cavities, in that a fish processing station along the transport path $T_H$ of the suspended conveying device is designed and configured as a heading apparatus. The symmetrical position of the fish is very important particularly during heading. Every fish can be headed yield-efficiently due to the embodiment according to the invention.

An especially preferred embodiment is characterised in that the heading apparatus comprises a separating device for separating the body of fish suspended by the head, wherein the separating device comprises a pair of rotatably drivable circular knives and the circular knives are arranged in a V-shape to each other on opposing sides of the transport path $T_H$. Due to the position of the suspended fish on the one hand and the arrangement of the circular knife pair on the other hand, the heading cut can be performed in a particularly efficient manner, i.e. with the least possible loss of flesh. In other words, the circular knives can be guided accurately positioned and symmetrically into the fish such that the fish head is almost free of flesh. In other words, the maximum amount of flesh remains on the body, in particular also the neck flesh and the flesh in the area of the collar bones.

Expediently, a measuring device for detecting and/or determining the position of the collar bones of each suspended fish is arranged in transport direction T downstream of the conveying device and upstream of the heading apparatus in the transport path $T_H$ of the suspended conveying device. Guidance of the circular knives can be even more precise with this additional measuring device, since the exact position at which the circular knives enter is known.

Preferably, a device for capturing the pectoral fins is arranged in transport direction T downstream of the conveying device for horizontal transport of the fish and upstream of the heading apparatus in the transport path $T_H$ of the suspended conveying device. With this embodiment, every fish can be fed to the circular knives in the optimum orientation for separating the head from the body.

The object is also achieved by a method having the steps referred to hereinbefore in that the fish are transferred automatically from the lying position to a suspended position by way of the change-over device, in that the fish are gripped by the conveying device using the change-over device along the transport path $T_L$ and are brought into the suspended position while being transported along a transport path $T_H$. This method combines, in a particularly simple and effective manner, the advantages of transport in a lying position, especially when inserting and orienting the fish, with the advantages of suspended transport, especially when symmetrically positioning and providing them for actual processing.

The advantages arising from the individual process steps for the method according to the invention have already been explained in connection with the transporting station and the fish processing machine, which is why reference will be made to the relevant passages to avoid repetitions.

Preferably, the fish is transported abdomen-first in transport direction T, with the spine on webs extending transverse to the transport direction T of a conveyor belt of the transport element and with the head resting on an abutment element assigned to the conveyor belt, wherein fish-size-relevant data, in particular the thickness of the head perpendicular to the transport plane $E_H$ spanned by the conveyor belt and/or the width of the head in the transport plane $E_H$ in transport direction T are recorded and/or determined in a section I of the conveyor belt by a measuring device. With these process steps, the fish inserted manually or automatically is brought into a defined position in which the necessary data for the fish can then be recorded. Instead of the width of the head, the distance from the underside of the lower jaw of the fish transported abdomen-first to the web on which the fish rests with its spine can also be determined. Alternatively, the fish can also be transported spine-first such that the fish rests with the abdomen on the web.

In a preferred development, the position of the axis of symmetry of the head is determined based on the thickness of the head. Determining the central axis of the head creates the requirement for gripping the fish such that it is oriented precisely symmetrically in the suspended position, as a result of which subsequent processing can be performed particularly yield-efficiently.

Advantageously, the fish is fed in a section II of the conveyor belt to a gripping device which grips the fish by the head, wherein the position of the head perpendicular to the gripping device is adjusted by a height adjustment of the section II of the conveyor belt as a function of the data recorded and/or determined by the measuring device, such that in the region of the gripping device the fish head is located in the same plane as in the region of the measuring device. Due to the height adjustment, every fish regardless of its size is moved into the optimum gripping position which was previously recorded and/or determined by the measuring device.

An advantageous development of the method provides that for gripping the fish head by the lower jaw on the ventral side and by the upper jaw on the dorsal side, one spike body in each case penetrates the fish head by moving the two gripping arms of the gripping device bearing the spike bodies from a release position to a holding position. Bilateral penetration of the spike bodies provides a secure hold so that the fish can be transported further in the optimum orientation.

Preferably, each gripping device is transported along a suspended conveying device of the change-over device in a plane $E_V$, which is oriented perpendicular to the transport plane $E_H$, beyond the transport path $T_L$ of the conveying device along the transport path $T_H$ such that the fish gripped by the head pivot into the suspended position after leaving the conveying device. The fish are initially fed in in the horizontal position in order to optimise the orientation. The fish are gripped in the optimum orientation while still lying flat. By transporting the fish, suspended by the head, beyond the conveying device along the transport path $T_H$, which represents a simple elongation of the transport path $T_L$, the fish are deprived of their base so to speak, such that the freely suspended fish can then swing to a stop. This ensures particularly simple and reliable transfer of the fish.

Especially preferably, during transportation along the transport path $T_L$ from section I to section II of the conveyor belt, the fish are positioned from below between the gripping arms located in the release position, said gripping arms being moved from above in the vertical plane $E_V$ in the direction of the conveyor belt. Feeding in can also take place purely horizontally. However, in the preferred manner, the fish can be "threaded" between the open gripping arms in the release position particularly easily and collision-free from below. In the change-over area of section II, the gripping arms coming from above in their open position thus meet the fish being fed in from below such that they can be positioned easily and precisely between the gripping arms which are then movable along the transport path $T_H$.

For this purpose, the gripping arms are preferably moved towards each other in the vertical plane $E_V$ such that a rigid spike body with a single spike completely penetrates through the head of the fish from the dorsal side, while a second, rotatably supported spike body with at least two spikes penetrates into the head from the ventral side. While the spike body supports the fish head from the ventral side as a counter bearing so to speak, the spike body with its single spike penetrates completely through the head from the dorsal side such that the fish is fixed particularly securely. A particular advantage consists in that the spike penetrating completely forms the rotational axis for the fish when swinging down, wherein swinging down is supported by the rotatable spike body.

It has proven particularly advantageous for the transport speed of the conveyor belt to be varied dependent on the recorded and/or determined data, in particular the width of the head in the transport plane $E_H$ in transport direction T, when a fish is located in the region of the gripping device in such a way that the rotatable spike body with the at least two spikes meets the fish head at the same time as or chronologically before the rigid spike body. The fish all have a different width head or a different distance between the underside of the lower jaw and the web on which they rest. In order to always meet the optimum gripping point and/or to prevent displacement of the fish, due in particular to the rigid spike body prematurely striking the single rigid spike of the gripping device on the fish head, regardless of this position and/or size, the transport speed is reduced if necessary immediately prior to gripping so as to be accelerated back to the original transport speed immediately after gripping.

Advantageously, the transport speed of the conveyor belt is varied when a fish is located in the exit region A of the conveying device in such a way that the conveyor belt or the webs arranged thereon are prevented from colliding with the swinging fish, wherein the changes in the transport speed are coordinated with each other on gripping of the fish on the one hand, and on swinging of the fish on the other hand, by the partitioning of the conveyor belt. When the fish swings down, there is a risk that the fish still lying just on the conveyor belt will be contacted by the continuing conveyor belt and particularly by the upright web on which the fish has lain. To prevent this, the speed of the conveyor belt is briefly reduced so that a collision is precluded. The partitioning of the conveyor belt, i.e. the spacing of the webs and therefore of the fish on the conveyor belt, is selected such that a speed adjustment in one area does not affect the other area. Instead of reducing the transport speed of the conveyor belt of the conveying device, the suspended conveying device can also be accelerated accordingly.

Especially preferably, the fish run with their fish head onto a take-up element for recording and/or determining the fish-size-relevant data in such a way that the fish head is raised in relation to the transport plane $E_H$. As a result of the fish head running onto the take-up element, on the one hand the free space underneath the fish head is filled up and on the other hand the fish head is held in a defined position, which supports precise recording and/or determination of the relevant sizes.

Accordingly, the fish in the region of the gripping device also run onto a corresponding take-up element such that the fish lie with their head in the same plane in the region of the gripping device as in the region of the measuring device.

The method can be performed particularly suitably with a transporting station according to one or more aspects of the invention. The fish processing machine according to one or more aspects of the invention is suitable particularly for the heading of fish.

Further expedient and/or advantageous features and developments as well as preferred process steps emerge from or more embodiments of the invention and the description.

BRIEF DESCRIPTION OF THE DRAWINGS

Especially preferred embodiments of the transporting station and the fish processing machine in addition to the method are explained in greater detail with reference to the attached drawing. The drawing shows.

DETAILED DESCRIPTION OF THE INVENTION

Figure 1:
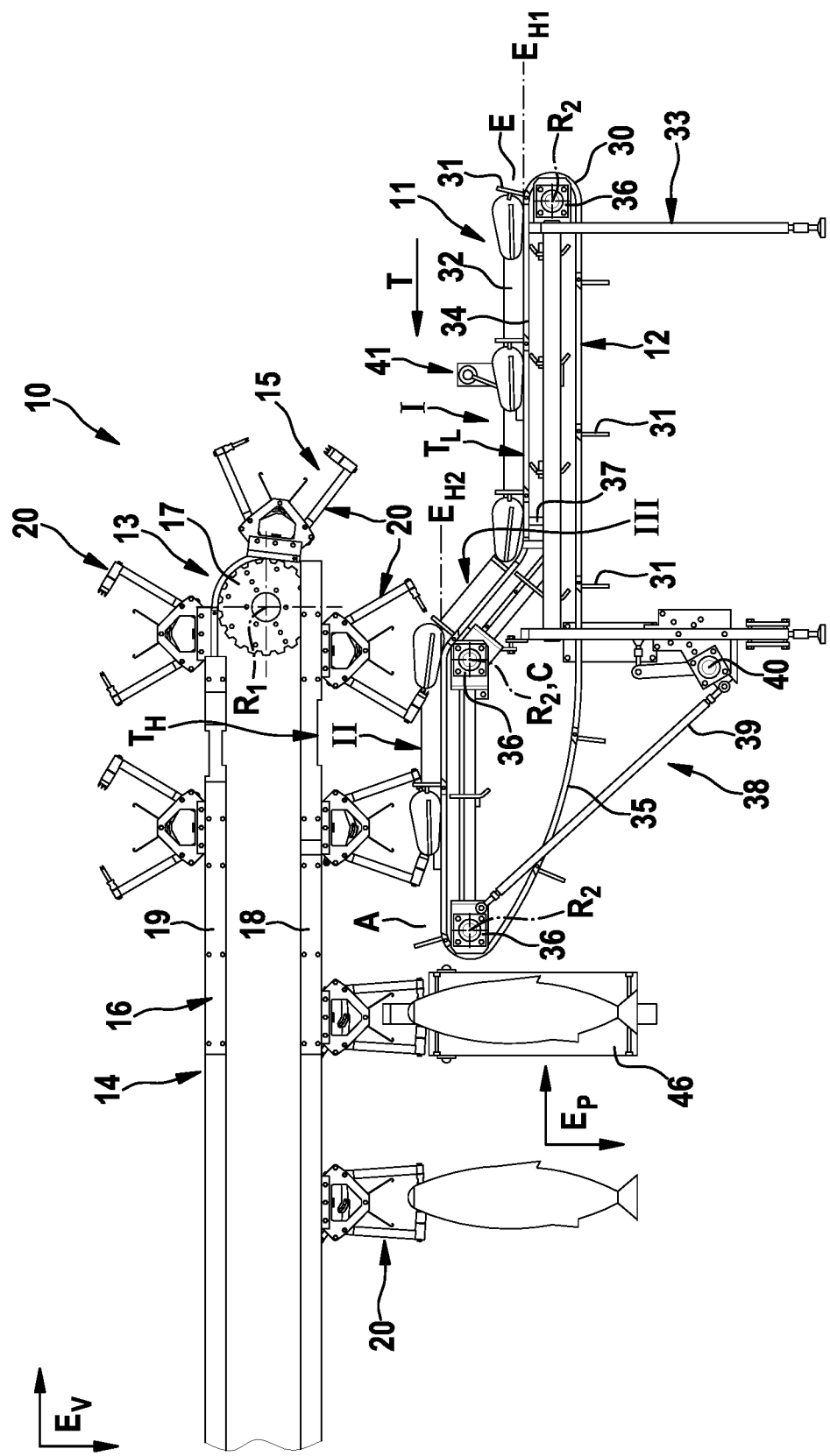
FIG. 1 shows a schematic representation of a first embodiment of the transporting station according to the invention in front view.

The transporting station illustrated in the drawing is used for changing the position of slaughtered salmon with opened abdominal cavities during transport abdomen-first in transport direction T from a horizontal to a suspended position. Of course, the transporting station according to the invention is also designed and configured for transferring the fish which are transported horizontally spine-first. The invention also relates in the same way to transporting stations with which other salmonidae and fish in general, whether slaughtered or unslaughtered, can be brought from a horizontal position into a suspended position.

The transporting station 10 illustrated in FIG. 1 is designed and configured for transporting fish transverse to their longitudinal extent in a transport direction T, and comprises a conveying device 11 for transporting individual, separated fish in a lying position along a transport path $T_L$ from an entry region E of the conveying device 11 to an exit region A of the conveying device 11, wherein the conveying device 11 comprises a rotationally driven transport element 12. As mentioned, lying transport of the fish may take place abdomen- or spine-first. The fish or a plurality of fish can lie together on the transport element, though singly and spaced apart.

This transporting station 10 is characterised according to the invention in that the conveying device 11 is assigned a change-over device 13 which is designed and configured and is in operative connection with the conveying device 11, in such a manner that the fish can be transferred automatically from the horizontal position on the transport path $T_L$ of the conveying device 11 into a suspended position on a transport path $T_H$ of the change-over device 13. The operative connection describes the interaction between the conveying device 11 for horizontally feeding the fish and the change-over device 13 for transferring the fish from the lying to the suspended position, in such a manner that the arrangement and assignment of conveying device 11 and change-over device 13 to each other guarantees collision-free contact of the change-over device 13 with the fish in order to then be able to grip them and bring them into the vertical position.

When taken on their own or in combination with each other, the features and developments as well as the process steps described below illustrate preferred embodiments. It is expressly pointed out that features and process steps which are summarised herein and/or the description and/or the drawing or are described in a common embodiment can also further develop the transporting station 10 described above as well as the method described below in a functionally independent manner.

The transport element 12 can be a rotationally driven conveyor belt or a transport chain on which the fish lie separately and with their head directed to a side edge of the transport element 12 such that the fish can be transported transverse to their longitudinal extent, preferably abdomen first, in transport direction T. The transport element 12 is associated with at least one drive, not explicitly shown, for rotationally driving the continuous transport element 12, wherein the transport element 12 is intermittently or preferably continuously drivable and at variable speed. The conveying device 11 for transport of the fish in a lying position and the change-over device 13 for transferring the fish from the lying position to the suspended position are arranged in such a manner in relation to each other that there is at least one region in which the conveying device 11 and the change-over device 13 can interact.

Optionally, the change-over device 13 comprises a suspended conveying device 14, arranged above the conveying device 11 for transport of the fish in a lying position, for transporting the fish suspended along a transport path $T_H$ and a device 15 for transferring the fish, namely for removing the fish from the conveying device 11 for transport of the fish in a lying position and for holding the fish during suspended transport along the transport path $T_H$. In other words, the suspended conveying device 14 is arranged spaced apart from the transport plane $E_H$ of the conveying device 11 vertically upwards such that the device 15 for transferring the fish, which is associated with the suspended conveying device 14, can be moved along collision-free above the conveying device 11 for transferring the fish.

The suspended conveying device 14 and the conveying device 11 form an overlapping region for transferring the fish, i.e. a region in which the suspended conveying device 14 and the conveying device 11 are arranged one above the other and parallel to each other. The free space of the conveying device 11 is limited upwards so to speak by the suspended conveying device 14. Preferably, however, the suspended conveying device 14 starts at a distance from the entry region E of the conveying device 11, viewed in the transport direction T. In other words, an area above the entry region E of the conveying device 11 is free. Starting at a distance from the entry region E of the conveying device 11, the suspended conveying device 14 extends at least up to the exit region A of the conveying device 11. The suspended conveying device 14 preferably extends beyond the conveying device 11 in transport direction T, wherein the change-over area for the fish from the conveying device 11 to the suspended conveying device 14 is formed in the overlapping region of the conveying device 11 and the suspended conveying device 14 in transport direction T upstream of the exit region A of the conveying device 11. The transport path $T_L$ coincides in the change-over area with the transport path $T_H$ and continues said path linearly in transport direction T. Downstream of the exit region A of the conveying device 11, the area underneath the suspended conveying device 14 is free.

The suspended conveying device 14 preferably comprises a rotationally driven transport element 16 on which the device 15 for removing and holding the fish is arranged. The transport element 16 is associated with at least one drive, not shown, for rotationally driving the continuous transport element 16, wherein the transport element 16 is intermittently or preferably continuously drivable and at variable speed. The transport element 16 may be a transport belt, a conveyor belt or the like. The transport element 16 is preferably designed as a single or double transport chain and is guided about deflecting and/or drive body 17. In an advantageous embodiment, two deflecting and/or drive bodies 17, for example in the form of rollers, gear wheels or the like, are provided. The central and/or rotational axes $R_1$ of the deflecting and/or drive bodies 17 are oriented horizontal and transverse to the transport direction T. The device 15 for removing and holding the fish is thereby moved in a vertical plane $E_V$. In other words, the device 15 for removing and holding the fish hangs down as a transport run on a lower run 18 of the transport element 16 in the direction of the conveying device 11, while it stands upright as a return run on an upper run 19 of the transport element 16. In the region of the deflecting and/or drive bodies 17, the device 15 follows the radius of the deflecting and/or drive bodies 17 and at the beginning of the change-over area moves towards the conveying device 11 at the end directed towards the entry region E of the conveying device 11 and at the opposing end upwards. In the change-over area, the device 15 has the smallest distance from the transport element 12 of the conveying device 11.

The device 15 for removing and holding the fish comprises a plurality of gripping device 20 rotating with the transport element 16 of the suspended conveying device 14, wherein each gripping device 20 has two gripping elements 21, 22, of which at least one gripping element 21 or 22 is provided with at least one spike 23, 29 directed towards the fish to be gripped. The gripping elements 21, 22 form a pincer-like tool. For this purpose, a first gripping element 21 comprises a gripping arm 24 with a torsionally fixed and rigid spike body 25 arranged on the free end and the second gripping element 22 comprises a gripping arm 26 with a rotatably supported spike body 27 arranged on the free end. The two gripping arms 24, 26 are designed and configured to be movable automatically towards each other into a holding position and away from each other into a release position and vice versa in the vertical plane $E_V$. In this case, the central and/or rotational axes M of the spike bodies 25, 27 are oriented horizontally and parallel to the transport direction T in the holding position. The gripping elements 21, 22 are each L-shaped. Each gripping arm 24, 26 forms the long leg of the Ls, while the spike bodies 25, 27 form the short leg. The spike bodies 25, 27 are arranged in the plane $E_V$ and are directed towards each other.

The gripping arms 24, 26 are associated with at least one drive and/or actuating mechanism, not explicitly shown, for performing the pivoting movement. Both gripping arms 24, 26 may also be associated with a common drive and/or actuating mechanism. However, the two gripping arms 24, 26 are preferably individually controllable, for example by way of a pneumatic cylinder or the like. The drives and/or actuating mechanisms for gripping arms 24, 26 are preferably controllable, i.e. in particular with regard to the speed of the pivoting movement on the one hand and the degree/angle for opening and closing the gripping arms in respect of each other on the other hand. The pivoting movement can also be cam-controlled. Instead of the clamping mechanism formed by the gripping arms 24, 26, other gripping device 20, for example in the form of clamping jaws or the like, can also be used. A plurality of gripping device 20 are preferably evenly distributed, i.e. at an equal distance from each other, along the transport chain. Each of these gripping device 20 passes through the change-over area when being rotationally driven by the transport chain. There is also the possibility that the gripping device comprises a rigid arm as the counter bearing for a movable gripping arm.

In a preferred embodiment, a first spike body 25 of the first gripping element 21 has a spike 23 completely penetrating the head of a fish, said spike entering the second spike body 27 in the holding position, which is why the second spike body 27 of the second gripping element 22 has an opening 28 for receiving the spike 23 of the first spike body 25, wherein at least two spikes 29 penetrating the head are arranged around the opening 28 of the second spike body 27. The second spike body 27 can also have three or more spikes 29 arranged concentrically around the opening 28. In the transporting station 10 illustrated, the first spike body 25 is provided with a single spike 23 and is rigidly designed. The second spike body 27 is designed as a rotating sleeve, in such a manner that the rotating sleeve is rotatably mounted on an axle. The gripping arm 24 with the rigid spike body 25 can be optionally assigned to the gripping device 22 engaging on the ventral side (on the lower jaw) or preferably to the gripping device 21 engaging on the dorsal side (upper jaw). The same applies to the gripping arm 26. In further embodiments, the spike bodies 25 and 27 can also have a different configuration.

The spike 23 of the rigid spike body 25 is preferably designed as a kind of hollow drill. The spikes 29 of the rotatable spike body 27 are designed as a type of thorns. However, all spikes 23, 29 can also have other shapes and configurations. The number and arrangement of the spikes 23, 29 can also vary. In developments that are not illustrated, there is also the possibility of providing two rotatably supported spike bodies each with at least two spikes or two rigid spike bodies each with one spike. The spikes 23, 29 can also have a length such that they all only penetrate into the head but do not penetrate through it. Instead of the spike bodies 25, 27, other fixing devices can also be provided for clamping, skewering or the like.

Preferably, in the embodiment illustrated, in the holding position, the only and central spike 23 of the first and rigid spike body 25 forms the pivot axis S oriented horizontally and parallel to the transport direction T for each fish, such that the fixed fish swings downwards on leaving the transport element 12 of the conveying device 11. The rotatable mounting of the second spike body 27 supports this process, wherein the spike 23 of the first, rigid spike body 25 acts as an axis of rotation.

Figure 2:
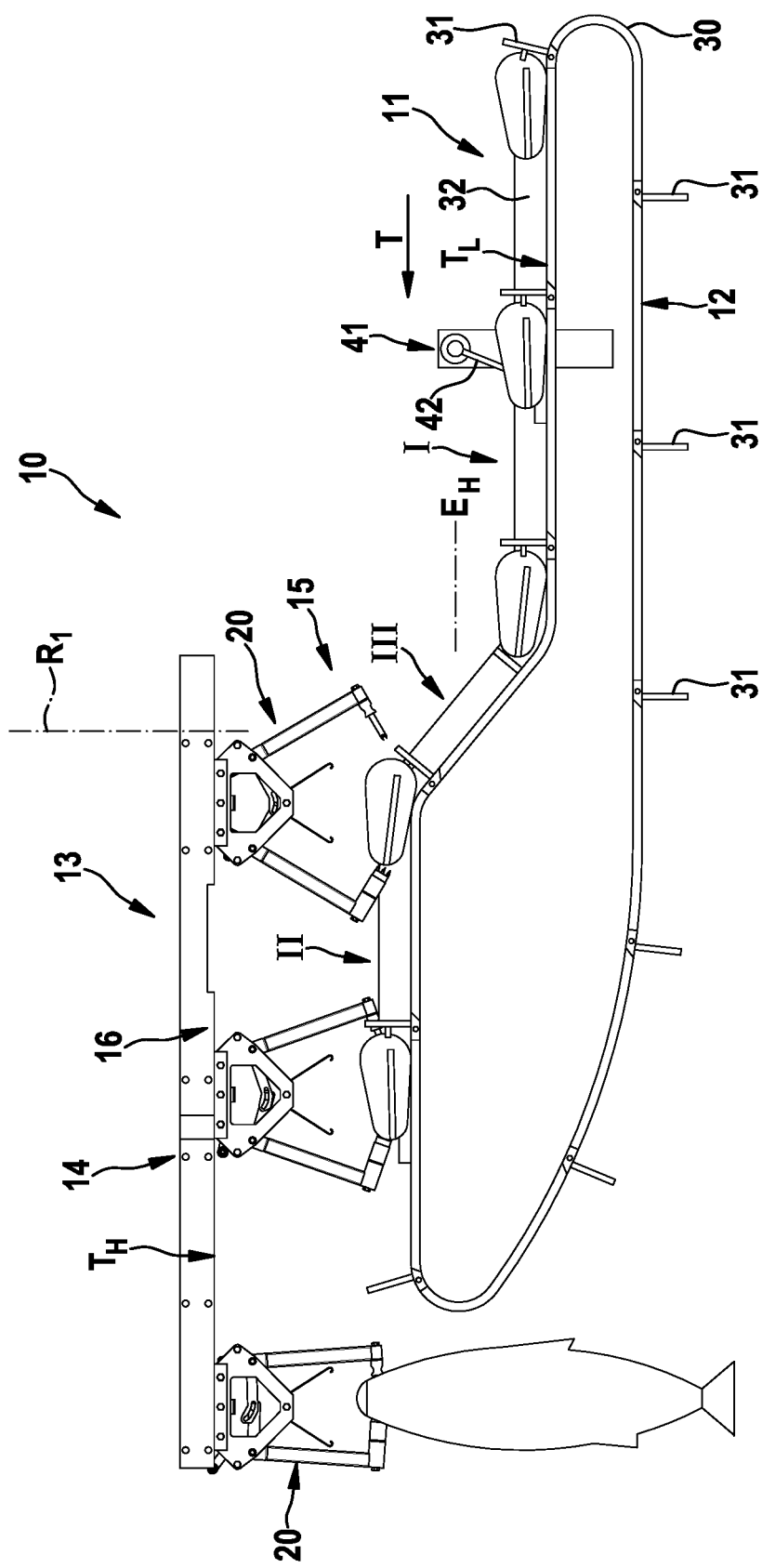
FIG. 2 shows a schematic and simplified representation of a further embodiment of the transporting station according to the invention in front view.
Figure 3:
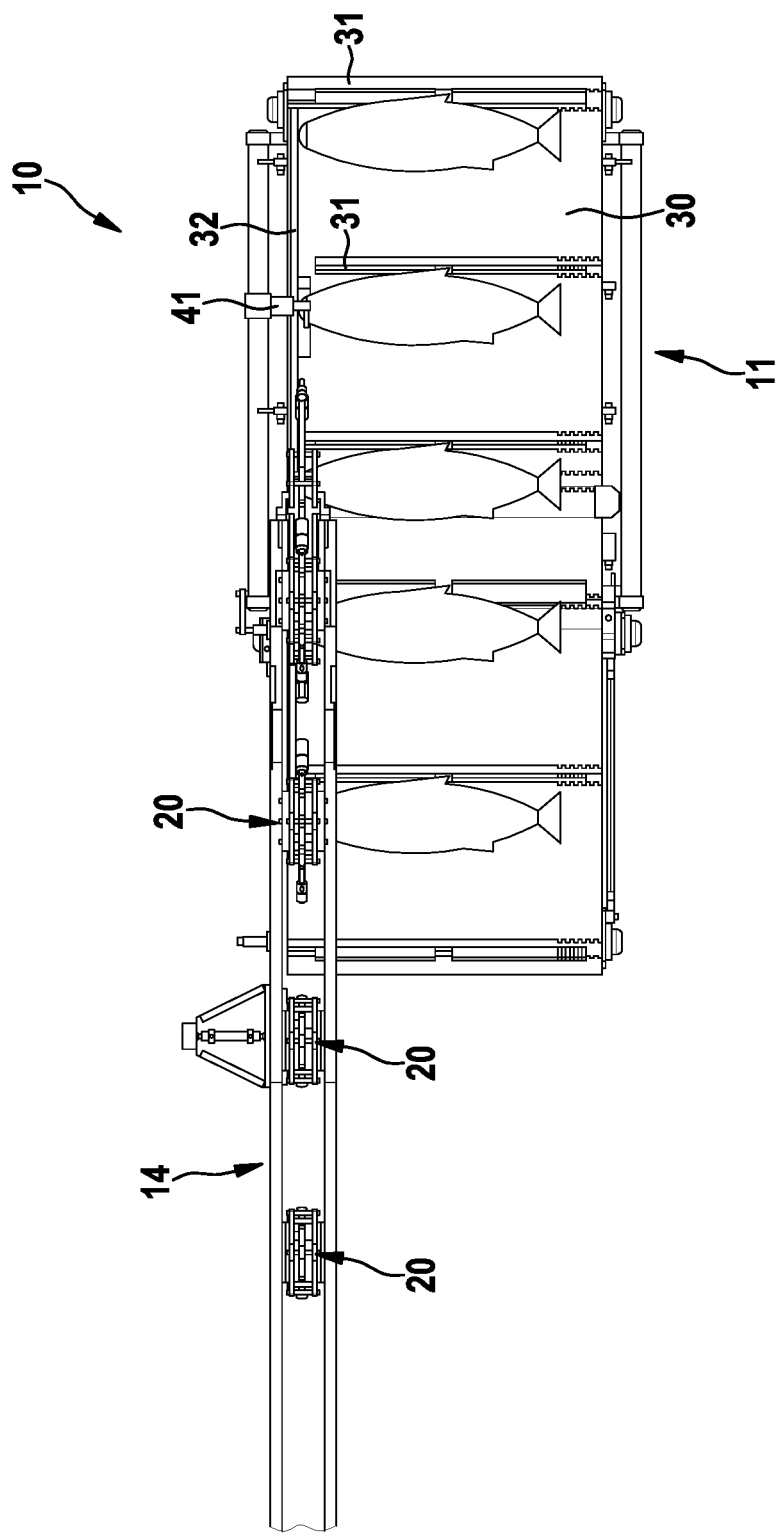
FIG. 3 shows a schematic representation of the transporting station according to FIG. 1 in a view from above.
Figure 4:
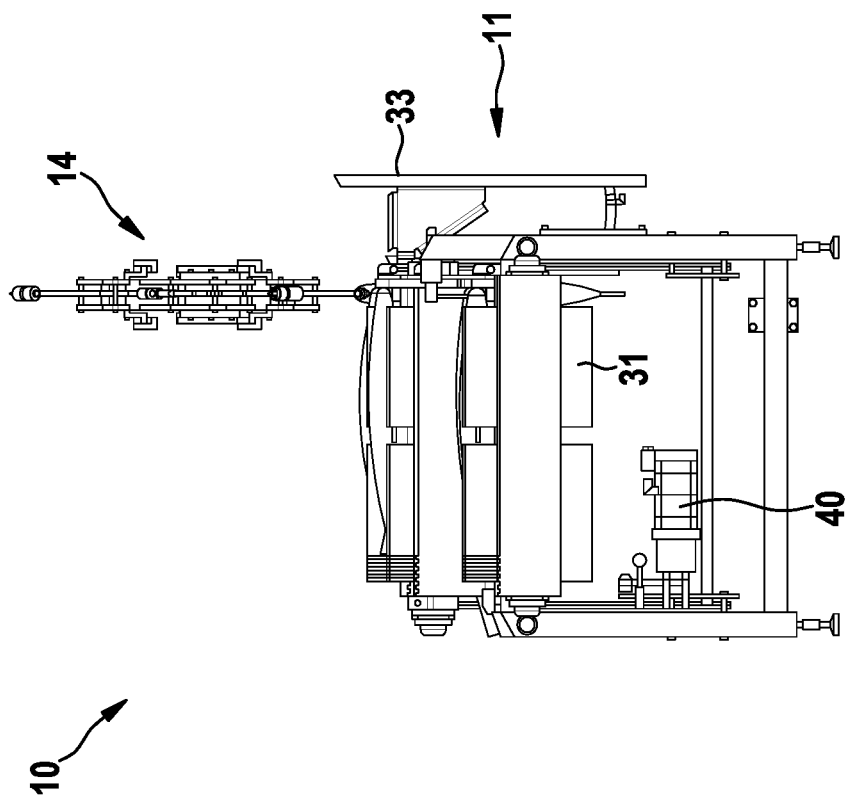
FIG. 4 shows a schematic representation of the transporting station according to FIG. 1 in lateral view (viewed in transport direction T)

In further embodiments, the suspended conveying device 14 can also be designed as a so-called carousel conveyor (see FIG. 2 for example). This means that the transport element 16 with the device 15 arranged thereon for removing and holding the fish can be moved in a horizontal plane. The central and/or rotational axes $R_1$ of the deflecting and/or drive bodies 17 are then oriented vertically (see FIG. 2 for example).

The transport element 12 of the conveying device 11 is designed and configured for transport of the fish in a lying position abdomen- or spine-first in transport direction T and comprises a conveyor belt 30 which has webs 31 running transverse to the transport direction T and extending perpendicular to the transport plane $E_H$ and rotating with the conveyor belt 30 for subdividing said conveyor belt 30 into individual sections for each receiving a single fish, wherein the webs 31 only extend in each case over part of the width of the conveyor belt 30. The webs 31 are permanently connected to the chain-like conveyor belt 30 or are formed integrally with it and are arranged at least on one side of the conveyor belt 30, on which the head of the fish is to be placed, spaced apart from the outer side edge of the conveyor belt 30. The webs 31 can also be otherwise interrupted and/or be designed on both sides with a gap to the outer side edge of the conveyor belt 30. The webs 31, which are also referred to as cleats, form an abutment for the ventral side or preferably dorsal side of the fish transverse to the transport direction T.

Preferably, on at least one side in transport direction T, a fixed abutment element 32 for positioning each fish in its longitudinal orientation transverse to the transport direction T is assigned to the conveyor belt 30, wherein the abutment element 32 is designed and configured for positioning the fish head in a defined position. The abutment element 32 can be a strip, for example, which can be mounted above the conveyor belt 30 slidingly and preferably contactlessly on a stationary frame/rack 33 of the transporting station 10, on which the suspended conveying device 14 can also be arranged, such that the conveyor belt 30 can be moved along below the strip. The strip extends on one side along the conveyor belt 30 at least partially from the entry region E up to the exit region A and forms the abutment surface for the head of the fish such that, when inserted manually or automatically, the fish rest with the spine on a web 31 and with the front tip of the mouth on the abutment element 32. Thus, it is possible to place the fish on the conveyor belt 30 in a defined position. Between the abutment element 32 and the webs 31 oriented perpendicular thereto, there is a gap due to the shortened design of the webs 31 transverse to the transport direction T, such that on the side edge on which the abutment element 32 is arranged, a kind of corridor is formed in which the head is transported from the entry region E to the exit region A.

The conveyor belt 30, which is formed from an upper run 34 as transport run and a lower run 35 as return run, is guided about at least three deflecting and/or drive bodies 36 whose central and/or rotational axes $R_2$ are oriented horizontal and transverse to the transport direction T. The upper run 34 can be continuously oriented horizontally to form the transport plane $E_H$. However, the upper run 34 is preferably designed to be stepped. The upper run 34 has a first section I which spans a transport plane $E_{H1}$ and a second section II following in transport direction T which spans a transport plane $E_{H2}$, wherein the transport plane $E_{H2}$ is located above the transport plane $E_{H1}$ such that the fish are transported by the conveyor belt 30 on an incline from the transport plane $E_{H1}$ to the transport plane $E_{H2}$ via a connecting section III. Of the three deflecting and/or drive bodies 36, for example deflecting rollers or similar, one of the deflecting and/or drive bodies 36 is arranged in the entry region E, another in the exit region A and a third between the outer deflecting and/or drive bodies 36 approximately in the region of the deflecting and/or drive body 17 of the suspended conveying device 14 situated above the conveying device 11. In the transition region of the conveyor belt 30 from the transport plane $E_{H1}$ to the transport plane $E_{H2}$, arranged at the beginning of the incline is a holding-down clamp 37 as a deflecting element by way of which the conveyor belt 30 is held so to speak in a defined track. The holding-down clamp 37 preferably only engages at the outer side edges of the conveyor belt 30 from above. The transport plane $E_{H2}$ also forms the change-over area for the fish.

The conveyor belt 30 is optionally designed to be height-adjustable at least in the change-over area. For this purpose, the section II of the conveyor belt 30 spanning the transport plane $E_{H2}$ can be designed, for example, to be pivotable by way of a drive 40 about a pivot axis C which is oriented horizontal and transverse to the transport direction T. The pivot axis C preferably coincides with the central and/or rotational axis $R_2$ of the central deflecting and/or drive body 36 of the conveyor belt 30 of the conveying device 11. A pivoting mechanism 38 is provided for this purpose. In the embodiment illustrated, the pivoting mechanism 38 comprises a lifting rod 39 and the drive 40 for operating said lifting rod 39. The lifting rod 39 engages in the exit region A of the transport element 12 such that the section II is pivotable up and down about the pivot axis C in order to vary the distance from section II to the transport element 16 of the suspended conveying device 14 and therefore to the gripping device 20.

In a preferred development, the transporting station 10 comprises at least one measuring device 41 for recording and/or determining fish-size-relevant data, in particular for determining the thickness of the head perpendicular to the transport plane $E_H$ and the width of the head in the transport plane $E_H$ in transport direction T. In the example illustrated, the measuring device is arranged upstream of the change-over area in transport direction T. The measuring device 41 can be designed mechanically, electromechanically, electronically, optically and in any other manner which makes it possible to determine, detect, register or calculate the height of the head vertical to the transport plane E and/or the width of the head horizontally in transport direction T. The measuring device 41 is preferably arranged fixedly above the conveying device 11 and comprises a measuring vane 42 which is designed and arranged for deflection by the fish head. The measuring vane 42 is arranged transverse to the transport direction T with a gap to the abutment element 32. In other words, the measuring vane 42 protrudes into the corridor formed between the abutment element 32 and the webs 31 such that the measuring vane 42 is inevitably deflected by the fish transported along the transport path $T_L$. The information necessary for determining the height and width of the head can be gathered based on the deflection, for example by way of an angle transmitter. The gap is selected such that fish of different sizes can be detected by way of the measuring vane 42. The size of the gap, for example, is between 15 and 40 mm and especially preferably approximately 30 mm.

Figure 5:
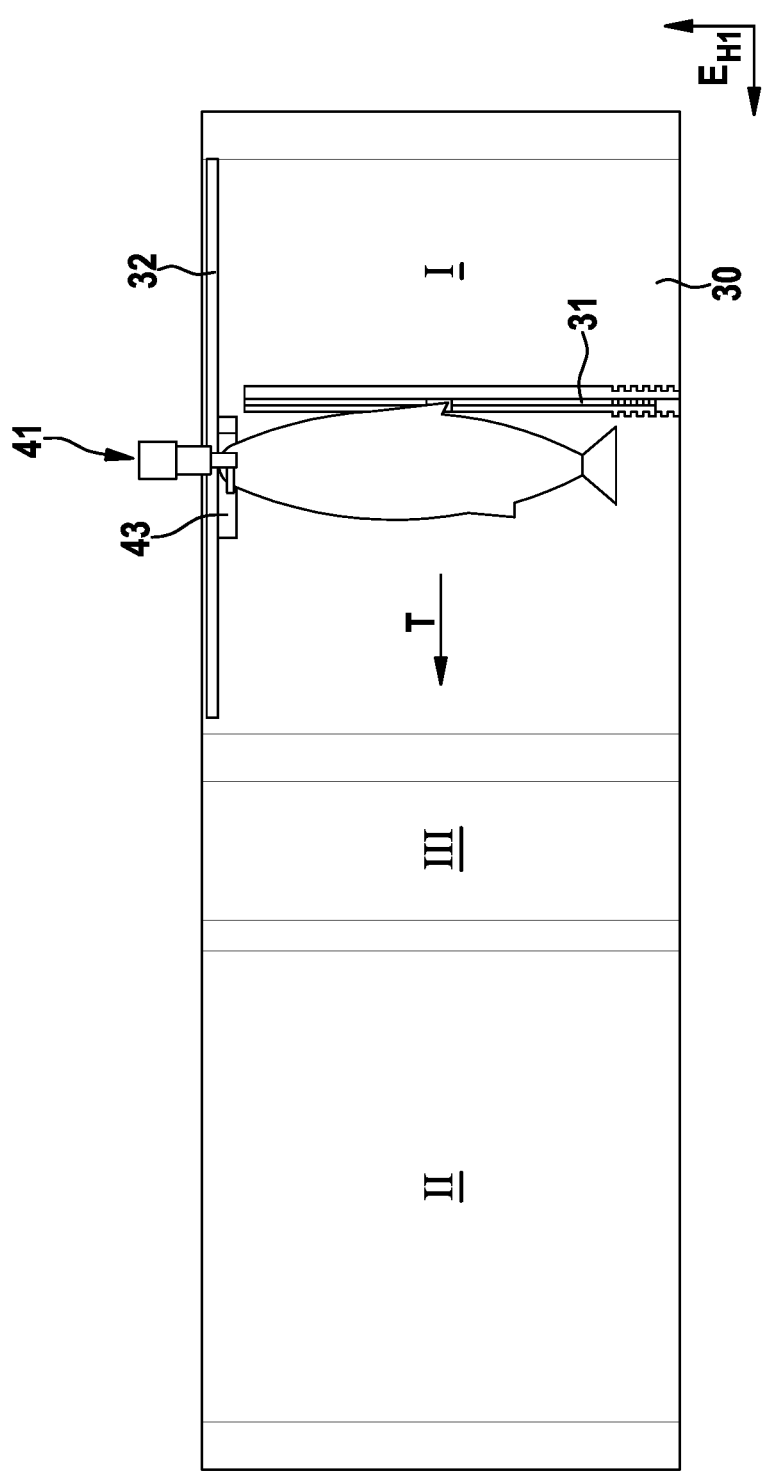
FIG. 5 shows a simplified representation of section I of the conveyor belt with measuring device.
Figure 6:
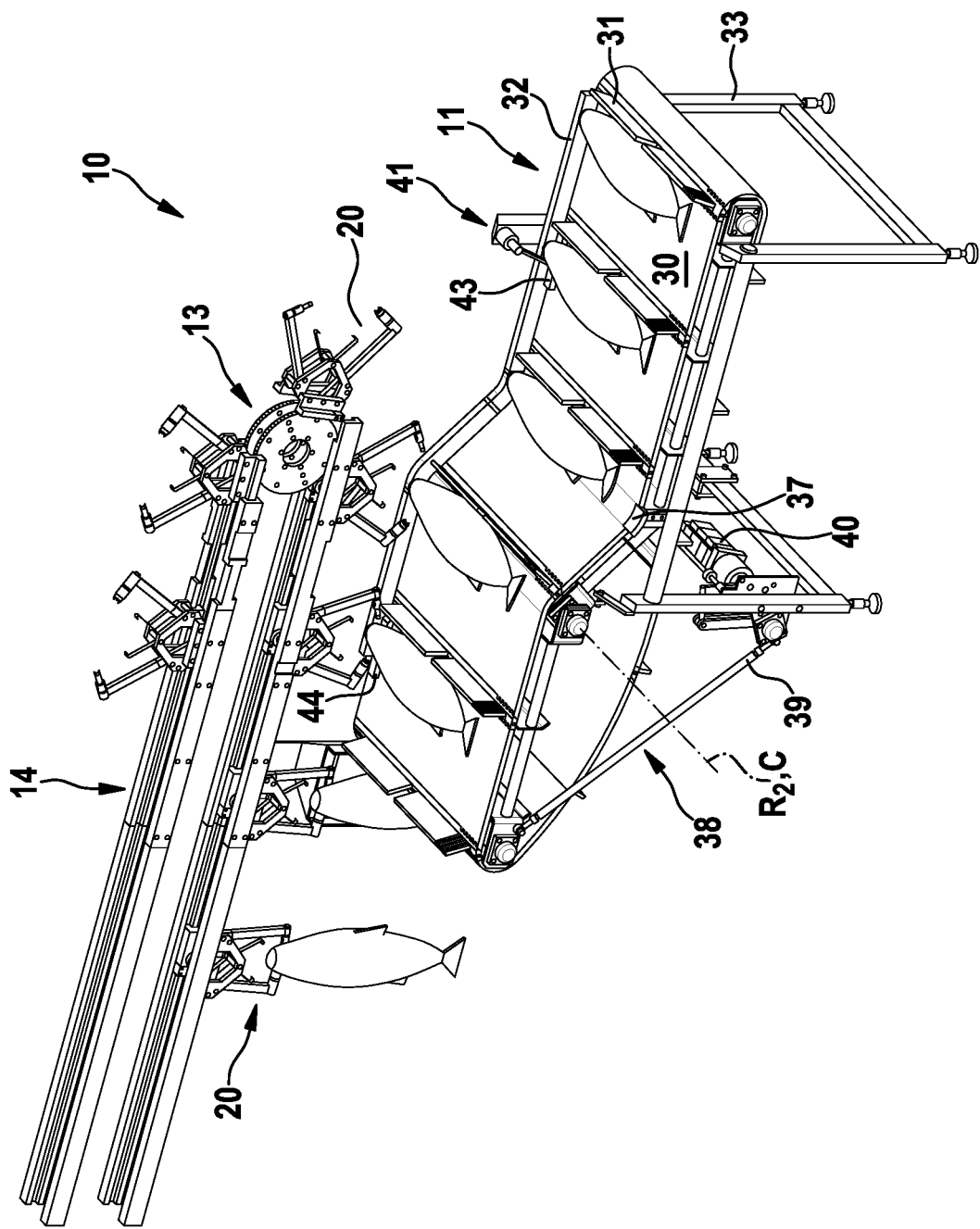
FIG. 6 shows a perspective view of the transporting station and in particular of section II of the conveyor belt with the height adjustment of the conveyor belt.
Figure 7:
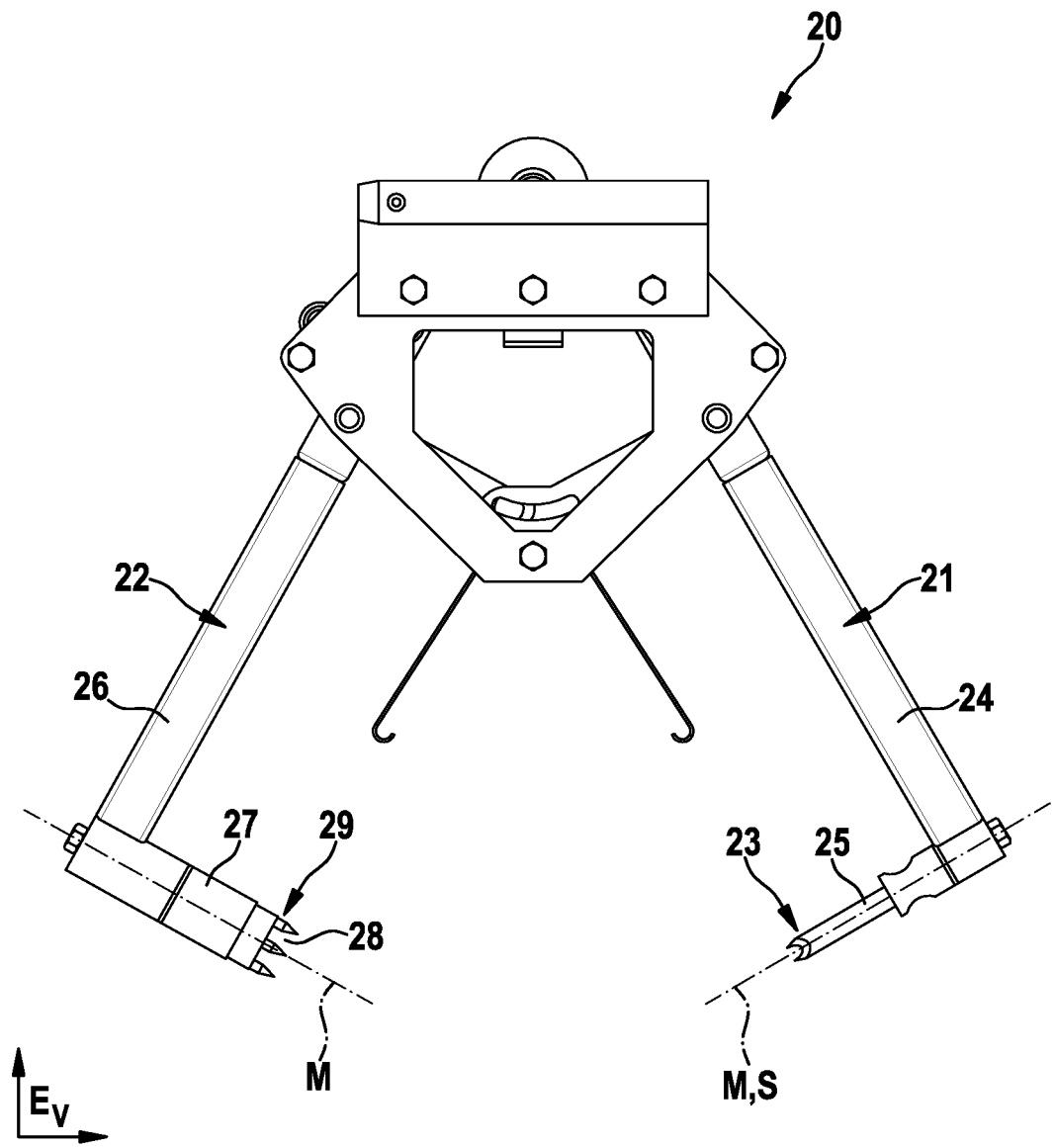
FIG. 7 shows an enlarged representation of the gripping device in release position.
Figure 8:
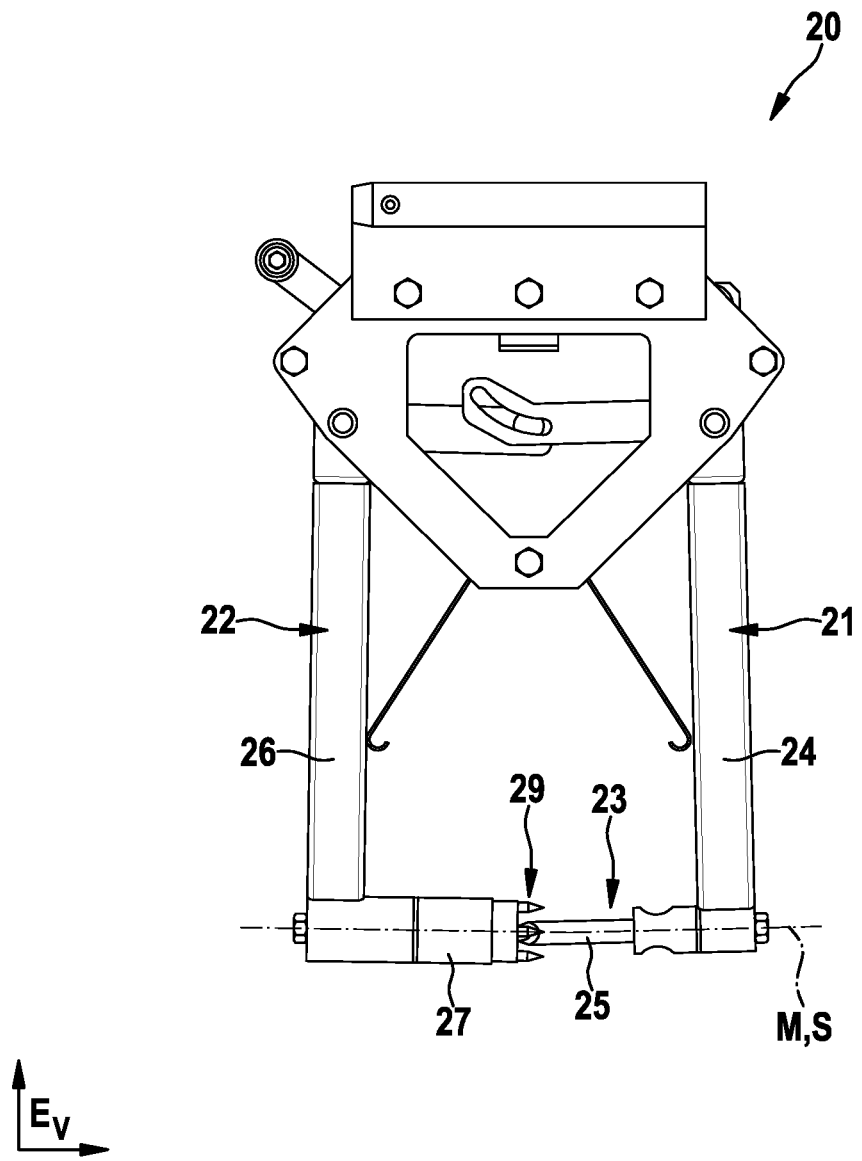
FIG. 8 shows an enlarged representation of the gripping device in holding position.
Figure 9:
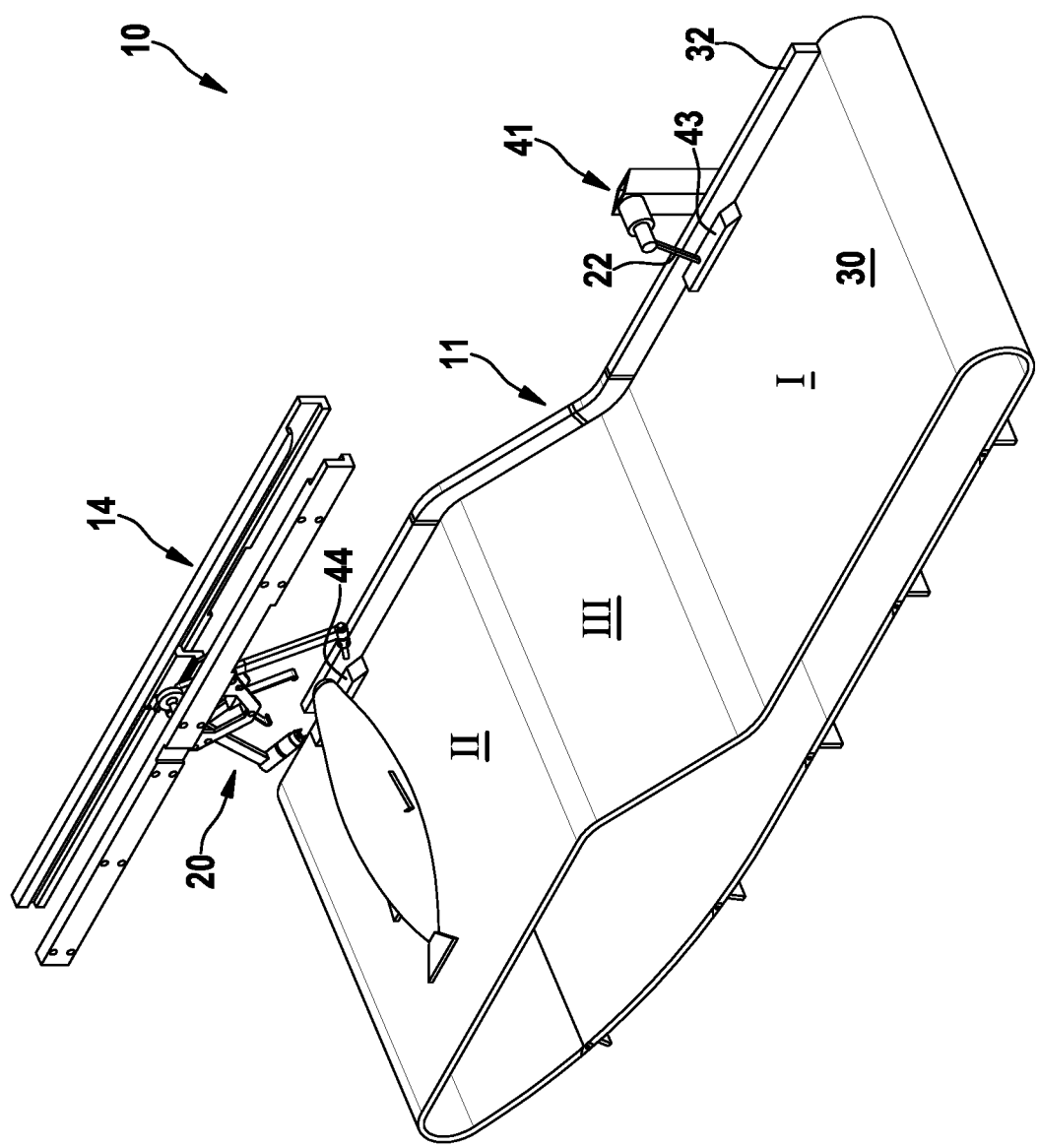
FIG. 9 shows a schematic enlarged representation of the take-up elements.

Preferably, in the region of the measuring device 41, namely directly below the measuring device 41, arranged on the abutment element 32 is a fixed take-up element 43 which is designed and configured to take up the fish with its head, in such a manner that the upper sliding surface of the take-up element 43 directed towards the measuring device 41, which is oriented parallel to the transport plane $E_{H1}$, forms the reference plane for the measuring device 41 when determining the thickness of the fish head and the position of the axis of symmetry of the fish head. The take-up element 43 ensures that the fish head is supported during the measurement by filling the free space existing underneath the fish head due to the anatomical conditions of the fish. The measuring device 41 is calibrated in this variant to determine the distance from the upper sliding surface to the highest point of the fish head. The take-up element 43 is preferably releasably attached to the abutment element 32 and first has a ramp-like gradient in transport direction T which merges into the horizontal sliding surface. The underside of the take-up element 43 is oriented parallel to the conveyor belt 30 and is low friction or better still frictionless, thus preferably arranged at a small distance from the conveyor belt 30 such that the conveyor belt 30 can be moved along below the take-up element 43. Starting from the abutment element 32, the take-up element 43 extends transverse to the transport direction T towards the centre of the conveyor belt, that is preferably in an extension corresponding to the expected region of the fish heads. In any case, the described width of the take-up element 43 towards the centre of the conveyor belt 30 is smaller than the distance between the abutment element 32 and the webs 31 of the conveyor belt 30 (see, for example, FIG. 5).

Especially preferably, a take-up element 44, which is designed and configured to take up the fish with its head, is also arranged fixedly on the abutment element 32 in the change-over area, wherein the two take-up elements 43, 44 are identically designed in respect of their height starting from the surface of the conveyor belt 30 up to the upper sliding surface of the take-up element 43, 44, such that the position of the axis of symmetry of the fish head determined by the measuring device 41 is reproducible in the change-over area. Both take-up elements 43, 44 are correspondingly designed in their geometry and are identical in their dimensions and are correspondingly arranged at different positions along the transport path $T_L$ in accordance with the abutment element 32 and the conveyor belt 30.

Especially preferably, the transporting station 10 comprises a control device 45, wherein the or each drive for the conveyor belt 30 of the conveying device 11 and/or the or each drive 40 for the height adjustment of the conveyor belt 30 of the conveying device 11 and/or the measuring device 41 are connected to the control device 45. All positioning and orientation steps of the fish for optimum gripping of the fish in their axis of symmetry can then be carried out by the conveying device 11. In the embodiments shown, the suspended conveying device 14 is correspondingly fixed in respect of its position. In other words, the gripping device 20 always run along the identical track. To change the distance between the transport chain of the suspended conveying device 14 or the gripping device 20 on the one hand and the conveyor belt 30 of the conveying device 11 on the other hand, in particular in the change-over area, optionally the lower run 18 of the transport element 16, for example, can also be designed as height-adjustable. There is also the possibility that the gripping device 20 are adjustable in their distance from the conveyor belt 30. For this purpose, possible adjusting drives, actuating mechanisms, adjusting cylinders or the like as well as drives for the transport element 16 can be connected to the control device 45.

As already mentioned above, the distance of the measuring vane 42 from the abutment element 32 is defined transverse to the transport direction T. Preferably, the distance of the measuring device 41 or the measuring vane 42 from the abutment element 32 transverse to the transport direction T, i.e. the measuring point, at which the measuring vane 42 meets the side of the lower jaw on the fish head, corresponds to the distance of the central and/or rotational axes M of the spike bodies 25, 27 in the holding position from the abutment element 32 transverse to the transport direction T. In other words, the spike bodies 25, 27 are arranged and oriented in such a manner of the gripping arm 24, 26 and arranged with a distance from the abutment element 32 such that the central spike 23 of the rigid spike body 25 is located precisely in the region of the measuring point, wherein the "finding" of the exact position of the measuring point is supported by the height adjustment of the change-over area and/or speed adjustments of the conveyor belt 30 by way of the control device 45.

In a preferred development, an impact element 46, directed substantially vertically downwards from the transport plane $E_{H2}$, whose impact surface is oriented in the direction of the suspended fish, is arranged in transport direction T, downstream of the conveying device 11 for horizontal transport of the fish and alongside the transport path T$_H$ of the suspended conveying device 14. Preferably, a single impact element 46, for example in the form of a simple impact plate or an impact body mounted against a spring force, is provided. The plane E$_P$ spanned by the impact element 46 or its impact surface is approximately parallel to the vertical plane E$_V$ described by the suspended conveying device 14 or its rotating gripping device 20 and approximately perpendicular to the transport plane E$_H$, such that the fish leaving the conveyor belt 30 of the conveying device 11 and suspended on the suspended conveying device 14 swing down about the axis of rotation S and strike against the impact element 46 with the lateral flank, with which they have lain on the conveyor belt 30, approximately in the vertical orientation of their axis of symmetry.

In an embodiment not illustrated, a centring mechanism can also be used for positioning the fish instead of the measuring device 41 and the take-up element 43, 44 on the one hand and the height adjustment of the conveyor belt 30 on the other hand. This centring mechanism comprises two positioning elements which are designed to be movable towards and away from each other. The two positioning elements are movable in an imaginary plane that is not to be understood as a mathematical plane, wherein this plane is oriented perpendicular to the transport plane E$_H$ and extends in transport direction T. The positioning elements each have an approximately triangular recess or more precisely a recess adapted to the contour of fish heads. One of the positioning elements is designed to engage on the fish head on the ventral side and the other positioning element is designed to engage on the fish head on the dorsal side. As the two positioning elements are arranged offset to each other transverse to the transport direction, by moving the two positioning elements towards each other the recesses form a kind of parallelogram which decreases in size as a result of which the fish is brought into a defined position regardless of its size. Sharp-edged surrounds of the recesses additionally form a positioning aid in the longitudinal direction of the fish. As soon as the fish lies and is fixed in the centred position, the gripping device 20 already described comes into use. The embodiment and functionality of the gripping device 20 is equivalent.

The transporting station 10 can be designed as an independent system, in particular also as a retrofit unit. However, the transporting station 10 is preferably part of a fish processing machine 47 (see, for example, FIG. 10). Such a fish processing machine 47 comprises a transporting station 10 for transporting the fish into the region of a fish processing station 48 and at least one fish processing station 48. The transporting station 10 is preferably designed and configured according to one or more aspects of the invention, wherein the or each fish processing station 48 is arranged in the region of the suspended position of the fish. In other words, the transporting station 10 is designed in the manner previously described in detail. Due to the fact that the fish processing station 48 is arranged in the region of the suspended fish, on reaching the fish processing station 48, the fish in their perpendicular position with a vertically oriented axis of symmetry can be optimally processed. This position is particularly important for the heading cut of the already slaughtered fish.

The fish processing machine 47 is preferably designed and configured for heading unslaughtered and/or slaughtered fish with opened abdominal cavities, in that a fish processing station 48 along the transport path T$_H$ of the suspended conveying device 14 is designed and configured as a heading apparatus 49. This heading apparatus 49 comprises a separating device 50 for separating the body of fish suspended by the head, wherein the separating device 50 comprises at least one pair of rotatably drivable circular knives 51, 52 and the circular knives 51, 52 are arranged in a V-shape to each other on opposing sides of the transport path T$_H$. A second pair of rotatably drivable circular knives 51.1, 52.1 is preferably provided. Preferably, the circular knives 51, 52, which are preferably designed and configured to perform a so-called heading cut, can be adjusted in several degrees of freedom. The circular knives 51.1, 52.1, which are preferably designed and configured for final separation of the body from the head, are designed to be at least height-adjustable.

Preferably, a measuring device 53 for detecting and/or determining the position of the collar bones of each suspended fish is arranged in transport direction T downstream of the conveying device 11 and upstream of the heading apparatus 49 in the transport path T$_H$ of the suspended conveying device 14. The measuring device 53 is still arranged downstream of the impact element 46 in transport direction T and is designed and configured to scan the fish bilaterally, i.e. on both lateral flanks. For this purpose, in a preferred embodiment, the measuring device 53 comprises two spring-loaded scanning arms, which are designed to be movable in transport direction T and simultaneously obliquely downwards on a common slide or separate slide, in such a manner that they are designed on the one hand to run synchronously and on the other hand scanning the fish from top to bottom. For this purpose, the or each slide is designed to be drivable by way of a linear drive obliquely downwards along rails from the upper starting position and back. In a further preferred embodiment (see, for example, FIG. 10), the measuring device 53 is designed as an optical measuring device. In addition, it is possible, downstream of the conveying device 11 and upstream of the fish processing station 48, to provide a device for rotating the suspended fish, preferably by 90°, in such a manner that the suspended fish hit the fish processing station 48 laterally, i.e. with the "jaw" first.

Figure 10:
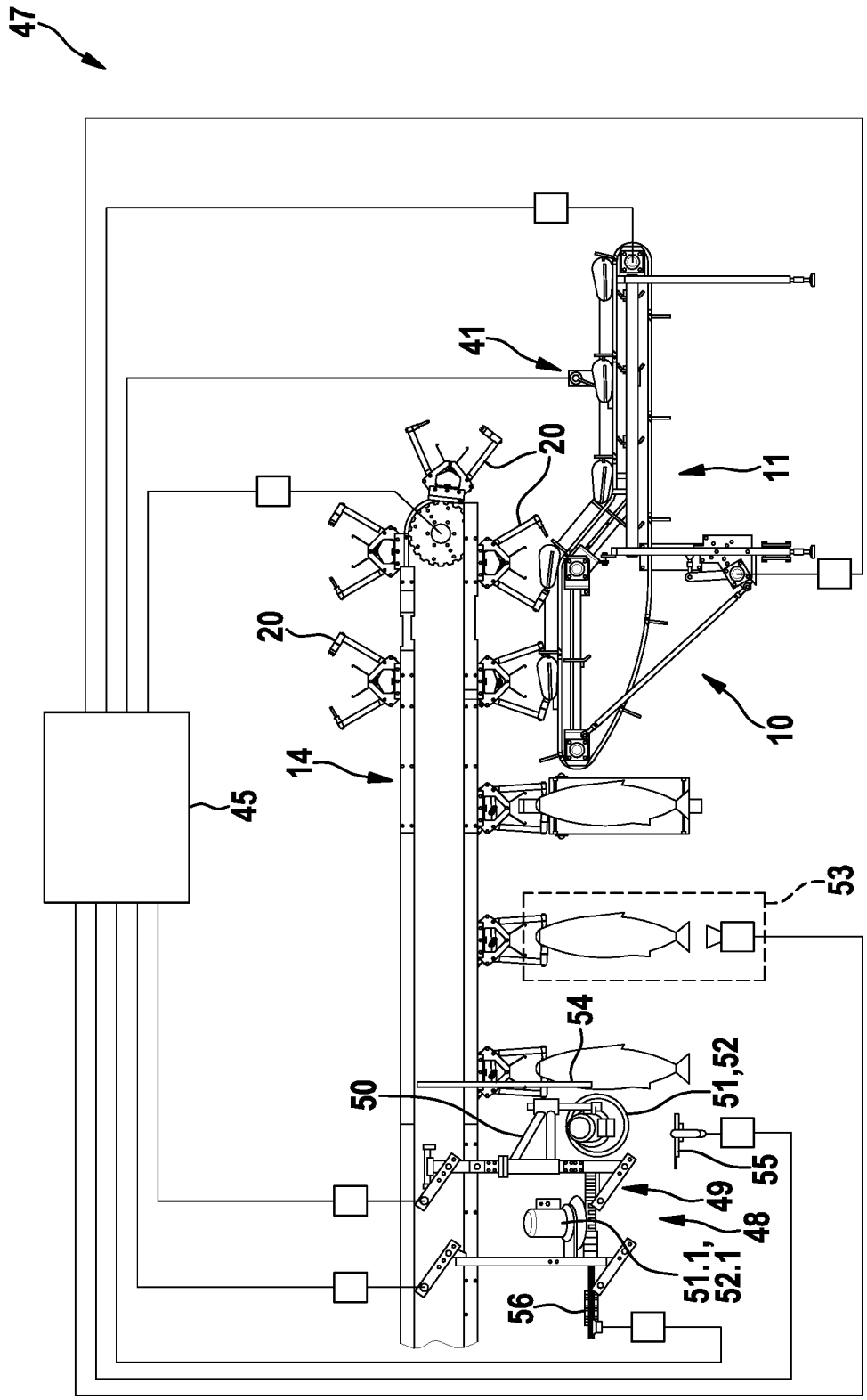
FIG. 10 shows a schematic representation of a fish processing machine with the first embodiment of the transporting station according to the invention in front view.

A development of the fish processing machine 47 provides that a device 54 for capturing the pectoral fins is arranged in transport direction T downstream of the conveying device 11 for horizontal transport of the fish and upstream of the heading apparatus 49 in the transport path T$_H$ of the suspended conveying device 14. This device 54, which is arranged in the transport direction downstream of the device 53, is used primarily to stabilise the suspended position of the fish and to keep clear the cutting region for the circular knives 51, 52. Optionally, the fish processing machine 47 can comprise transport conveyors for transporting away the bodies separated from the head and/or for transporting away the heads released from the clamping of the gripping device 20. Further fish processing stations 48 can be provided in addition to the heading apparatus 49. FIG. 10 optionally illustrates further components, such as a height-adjustable circular knife 55 for severing the tail fin. In addition, in the region of the or each fish processing station 48, a device 56 can be arranged for holding the fish body, in particular during the separation process. This device 56 optionally has two rotationally driven chains which can be brought into operative connection with the fish body. As indicated in FIG. 10, all drive, transport, measuring and processing components can be connected to the central control device 45. It is also possible to only connect individual components to the control device 45. Optionally, a plurality of separate control devices that are coordinated with each other can also be provided.

The method for changing the position of a fish is described in greater detail below. First, the fish are individually deposited on a rotationally driven transport element 12 of a conveying device 11 for transporting the fish in a lying position along a transport path $T_L$ and transporting the fish along the transport path $T_L$ from an entry region E of the conveying device 11 to an exit region A of the conveying device 11.

This method is characterised according to the invention in that the fish are transferred automatically from the lying position to a suspended position by way of the change-over device 13, in that the fish are gripped by the conveying device 11 using the change-over device 13 along the transport path $T_L$ and are brought into the suspended position while being transported along a transport path $T_H$. The fish which are positioned on the transport element 12, already oriented in their longitudinal extent during manual or automatic placement, thus pass through the conveying device 11 along the transport path $T_L$, wherein the fish are then gripped by the change-over device 13 while passing through, such that during further transport the fish slip from the transport element 12, held, however, by the change-over device 13 and are transported further along the transport path $T_H$. For the change-over, the two transport paths $T_L$ and $T_H$ run in part parallel and in a plane one above the other such that the change-over device 13 and the conveying device 11 can come into operative connection with each other at least temporarily. In simple terms, in sections the two transport paths $T_L$ and $T_H$ describe an identical route in order to ensure the change-over.

The fish are transported preferably abdomen-first in transport direction T, with the spine on webs 31 extending transverse to the transport direction T of a conveyor belt 30 of the transport element 12 and with the head resting on an abutment element 32 assigned to the conveyor belt 30. Optionally, the fish can also be transported spine-first such that the abdomen rests on the web 31. During transport in transport direction T, the fish on the transport element 12 pass through a measuring station. Fish-size-relevant data, in particular the thickness of the head perpendicular to the transport plane $E_H$ spanned by the conveyor belt 30 and/or the width of the head in the transport plane $E_H$ in transport direction T are recorded and/or determined in a section I of the conveyor belt 30 by a measuring device 41. Recording and determining also includes identifying, calculating or any other kind of evaluation. The thickness of the head can be determined absolutely, i.e. from sidewall to sidewall of the fish head, or starting from a lower reference plane, for example the surface of the conveyor belt 30, or (see below) a surface if a take-up element 43, up to the highest point of the fish head. Instead of the width of the head from the outside of the lower jaw up to the outside of the upper jaw, the distance from the leading side of the head, in the preferred example the outside of the lower jaw, up to the web 31 on which the fish rests, can also be determined. If the thickness of the head is known, the position of the axis of symmetry or the centreline of the head can be determined accordingly.

This data/information can preferably be stored so that it is possible to assign the data/information to each fish. For this purpose, a control device 45 can have a memory. Depending on the measured values recorded and/or determined, the conveyor belt 30 is moved in the region of the gripping device 20. More precisely, the fish is fed in a section II of the conveyor belt 30 to a gripping device 20 which grips the fish by the head. For this purpose, the position of the head perpendicular to the gripping device 20 is adjusted by a height adjustment of the section II of the conveyor belt 30 dependent on the data recorded and/or determined by the measuring device 41. For example, the section II is pivoted about an axis in order to change the distance of the conveyor belt 30 from the gripping device 20 such that in the region of the gripping device 20 the fish head is located in the optimum and previously determined position to the gripping device 20, i.e. in the same plane as in the region of the measuring device 41. In other words, the fish with its fish head is raised or lowered in order to strike the previously determined centreline of the fish head precisely with the gripping device 20.

For gripping the fish head by the lower jaw on the ventral side and by the upper jaw on the dorsal side, one spike body 25, 27 in each case penetrates the fish head, by moving the two gripping arms 24, 26 of the gripping device 20 bearing the spike bodies 25, 27 from a release position into a holding position. Instead of the spike bodies 25, 27, other clamping or holding elements can also be used in order to fix the fish securely by its head. Once this form-fitting and force-fitting fixing of the fish has taken place in the change-over area between suspended conveying device 14 and conveying device 11, further transporting of the fixed fish in transport direction T, due to deflection of the conveyor belt 30 from the upper run 34 to the lower run 35, leads to the fish swinging downwards. Each gripping device 20 is transported along a suspended conveying device 14 of the change-over device 13 in a plane $E_V$, which is oriented perpendicular to the transport plane $E_H$, beyond the transport path $T_L$ of the conveying device 11 along the transport path $T_H$, such that the fish gripped by the head pivot into the suspended position after leaving the conveying device 11. The impact element 46 can slow down the pivoting or swinging of the fish.

In order in each case to bring the fish collision-free and precisely between the gripping arms 24, 26 lowering in the direction of the conveyor belt 30 and spread apart, during transportation along the transport path $T_L$ from section I to section II of the conveyor belt 30, the fish are positioned from below between the gripping arms 24, 26 located in the release position, said gripping arms being moved from above in the vertical plane $E_V$ in the direction of the conveyor belt 30. In other words, the fish to be fixed and the corresponding gripping device 20 come together in the change-over area, which is formed in the section II, in such a manner that the change-over device 13 can interact by way of the gripping arms 24, 26 and the spike bodies 25, 27 arranged thereon with the conveying device 11 and the fish transported thereon. However, the fish can also be fed into the change-over area horizontally. In this case, the gripping arms 24, 26 are preferably spread even further apart, for example at an angular position of 180°.

As mentioned, the gripping can be carried out by clamping jaws, clamping elements or the like. A particularly secure hold of the fish is achieved if the gripping arms 24, 26, which are located in the change-over area on the lower run 16 of the suspended conveying device 14 and therefore above the upper run 34 of the conveying device 11, are moved towards each other in the vertical plane $E_V$ such that a rigid spike body 25 with a single spike 23 completely penetrates through the head of the fish from the dorsal side, while a second, rotatably supported spike body 27 with at least two spikes 29 penetrates into the head from the ventral side. Due to the fact that spikes 23, 29 penetrate into or through on both sides of the fish head, the head is held securely and positionally accurately/precisely.

There is the option that the transport speed of the conveyor belt 30 is varied dependent on the recorded and/or determined data, in particular the width of the head in the transport plane $E_H$ in transport direction T, when a fish is located in the region of the gripping device 20 in such a way that the rotatable spike body 27 with the at least two spikes 29 meets the fish head at the same time as or chronologically before the rigid spike body 25. The transport speed of the conveyor belt 30 is preferably reduced briefly so that the rotatable spike body 27 penetrates the fish head as a counter bearing before the rigid spike body 25 pierces the skull plate of the fish head and other tissue and bone components. Subsequently, the transport speed is reset to the previous value. Optionally, the transport speed can also be increased briefly. On complete penetration of the spike 23 through the fish head, considerable forces arise which are absorbed by the rotatable spike body 27 such that the oriented position of the fish is maintained during fixing. However, the two spike bodies 25, 27 can also strike the fish head simultaneously.

In a further embodiment, the transport speed of the conveyor belt 30 can be varied when a fish is located in the exit region A of the conveying device 11 in such a way that the conveyor belt 30 or the webs 31 arranged thereon are prevented from colliding with the swinging fish. The transport speed of the conveyor belt 30 is preferably reduced briefly to enable the fish to swing down collision-free. As, for example, another fish is located in the region of the gripping device 20 while the first fish is being swung down, the changes in the transport speed when gripping the fish on the one hand and on swinging down of the fish on the other hand must be coordinated with each other. This is accomplished by the partitioning of the conveyor belt 30, i.e. the spacing of the webs 31 and therefore of the fish located on the transport element 12.

Especially preferably, the fish run with their fish head onto a take-up element 43 for recording and/or determining the fish-size-relevant data in such a way that the fish head is raised in relation to the transport plane $E_H$. While the fish are transported along the transport path $T_L$ and the fish heads slide along in the corridor formed by the abutment element 32 and the webs 31, the fish heads run below the measuring device 41 via the ramp-like gradient onto the upper sliding surface of the take-up element 43, such that a defined and reproducible position of the fish head in relation to the measuring device 41 is achieved. The measuring device 41 can then record the required data for the fish head mechanically, optically, electromechanically, electronically or in another manner. When the take-up element 43 is used in the region of the measuring device 41, a comparable run-on also occurs in the change-over area, specifically at the point at which the gripping device 20 grips the fish. For this purpose, the fish also runs in the region of the gripping device 20 onto a corresponding take-up element 44 such that the fish lie with their head in the same plane in the region of the gripping device 20 as in the region of the measuring device 41.

In the symmetrical position of each fish, optimally oriented by the transporting station 10 according to the invention, the fish is fed to its processing, in particular to a heading apparatus 49. For this purpose, the fish are transported suspended along the transport path $T_H$. When the symmetrically oriented fish reaches the heading apparatus 49, the body is separated from the fish head by way of the circular knives 51, 52 arranged in a V-shape. The body is picked up for subsequent processing and transported onwards. The fish heads are released from the fixing by opening the gripping arms 24, 26 to the release position and are also collected and transported for subsequent processing or discharge.

Before separation of the head, the fish can be measured yet again along the transport path $T_H$, for example by a measuring device 53 for detecting and/or determining the position of the collar bones of each suspended fish. The measuring device 53 scans the outer contour of the fish on both lateral flanks in order to find the position of the collar bones. Knowing the position of the collar bones, the circular knives 51, 52 can then be controlled even more precisely.

The invention claimed is:

1. A transporting station, designed and configured for transporting fish transverse to their longitudinal extent in a transport direction T, the transporting station comprising a conveying device for transporting individual, separated fish, while said fish are in a lying position, along a transport path $T_L$ from an entry region E of the conveying device to an exit region A of the conveying device, wherein the conveying device comprises a rotationally driven transport element, wherein the conveying device is assigned a change-over device which is designed and configured, and is in operative connection, with the conveying device, in such a manner that the fish can be transferred automatically from the lying position on the transport path $T_L$ of the conveying device into a suspended position on a transport path $T_H$ of the change-over device.

2. The transporting station according to claim 1, wherein the change-over device comprises a suspended conveying device, arranged above the conveying device for transport of the fish in a lying position, for transporting the fish suspended along a transport path $T_H$ and means a fish transport device for transferring the fish that can remove the fish from the conveying device for transport of the fish in a lying position and for holding the fish during suspended transport along the transport path $T_H$.

3. The transporting station according to claim 2, wherein the suspended conveying device extends beyond the conveying device in transport direction T, wherein the change-over area for the fish from the conveying device to the suspended conveying device is formed in the overlapping region of the conveying device and the suspended conveying device in transport direction T upstream of the exit region A of the conveying device.

4. The transporting station according to claim 2, wherein the suspended conveying device comprises a rotationally driven transport element on which the the fish transport device for removing and holding the fish is arranged, wherein the the fish transport device comprises at least one gripping device for gripping the head of a fish.

5. The transporting station according to claim 4, wherein the transport element of the suspended conveying device is a transport chain rotationally driven about a deflecting and/or drive body, whose central and/or rotational axes R1 are oriented horizontal and transverse to the transport direction T, in such a manner that the the fish transport device for removing and holding the fish is moved in a vertical plane Ev and has a smallest distance to the transport element of the conveying device in the change-over area.

6. The transporting station according to claim 4, wherein the the fish transport device for removing and holding the fish comprises a plurality of gripping devices rotating with the transport element of the suspended conveying device, wherein each gripping device has two gripping elements, of which at least one gripping element is provided with at least one spike directed towards the fish to be gripped.

7. The transporting station according to claim 4, wherein the first transport device comprises a first gripping element that comprises a gripping arm with a torsionally fixed and rigid spike body arranged on a free end and a second gripping element that comprises a gripping arm with a rotatably supported spike body arranged on a free end, wherein the gripping arms are designed and configured to be automatically movable towards each other into a holding position and away from each other into a release position and vice versa in a vertical plane EV and in the horizontal position a central and/or rotational axes M of each of the spike bodies are oriented horizontally and parallel to the transport direction T.

8. The transporting station according to claim 7, wherein a first spike body of the first gripping element has a spike for completely penetrating the head of a fish, said spike entering a second spike body in the holding position, whereby the second spike body of the second gripping element has an opening for receiving the spike of the first spike body, wherein at least two spikes penetrating the head are arranged around the opening of the second spike body.

9. The transporting station according to claim 8, wherein, in the holding position, an only and central spike of the first spike body forms a pivot axis S oriented horizontally and parallel to the transport direction T for each fish.

10. The transporting station according to claim 1, wherein the transport element is designed and configured for lying transport of a fish abdomen- or spine-first in transport direction T and comprises a conveyor belt which has webs running transverse to the transport direction T and extending perpendicular to the transport plane $E_H$ and rotating with the conveyor belt for subdividing said conveyor belt into individual sections for each receiving a single fish, wherein the webs only extend in each case over part of a width of the conveyor belt.

11. The transporting station according to claim 10, wherein on at least one side in transport direction T, there is arranged a fixed abutment element for positioning each fish in a longitudinal orientation transverse to the transport direction T which is assigned to the conveyor belt, wherein the abutment element is designed and configured for positioning the fish head in a defined position.

12. The transporting station according to claim 11, wherein the transporting station comprises a measuring device for recording and/or determining fish-size-relevant data, and for determining a thickness of the head of the first perpendicular to the transport plane $E_H$ and a width of the head in the transport plane $E_H$ in transport direction T, wherein the measuring device is arranged upstream of a change-over area in transport direction T.

13. The transporting station according to claim 12, wherein the measuring device is arranged fixedly above the conveying device and comprises a measuring vane which is designed and arranged for deflection by the fish head.

14. The transporting station according to claim 12, wherein in a region of the measuring device, that is directly below the measuring device, arranged on the abutment element is a fixed take-up element which is designed and configured to take up the fish with its head, in such a manner that the upper sliding surface of the take-up element directed towards the measuring device, which is oriented parallel to the transport plane $E_{H1}$, forms the reference plane for the measuring device when determining the thickness of the fish head and the position of the axis of symmetry of the fish head.

15. The transporting station according to claim 14, wherein a take-up element, which is designed and configured to take up the fish with its head, is also arranged fixedly on the abutment element in the change-over area, wherein the two take-up elements are identically designed in respect of their height starting from the surface of the conveyor belt up to the upper sliding surface of the take-up element, such that the position of the axis of symmetry of the fish head determined by the measuring device is reproducible in the change-over area.

16. The transporting station according to claim 12, wherein the transporting station comprises a control device, wherein each drive for the conveyor belt of the conveying device and/or each drive for a height adjustment of the conveyor belt of the conveying device and/or the measuring device are connected to the control device.

17. The transporting station according to claim 12, wherein a distance of the measuring device from the abutment element transverse to the transport direction T, corresponds to a distance of central and/or rotational axes M of the spike bodies in the holding position from the abutment element transverse to the transport direction T.

18. The transporting station according to claim 10, wherein the conveyor belt, which is formed from an upper run as transport run and a lower run as return run, is guided about at least three deflecting and/or drive bodies, whose central and/or rotational axes R2 are oriented horizontal and transverse to the transport direction T, and in the region of the upper run said conveyor belt has a first section I which spans a transport plane $E_{H1}$ and a second section II following in transport direction T which spans a transport plane $E_{H2}$, wherein the transport plane $E_{H2}$ is situated above the transport plane $E_{H1}$ such that the fish are transported by the conveyor belt on an incline from the transport plane $E_{H1}$ to the transport plane $E_{H2}$ via a connecting section III.

19. The transporting station according to claim 18, wherein the section II of the conveyor belt spanning the transport plane $E_{H2}$ is designed to be pivotable by way of a drive about a pivot axis C which is oriented horizontal and transverse to the transport direction T.

20. The transporting station according to claim 10, wherein the conveyor belt is designed to be height-adjustable at least in the change-over area.

21. The transporting station according to claim 1, wherein an impact element, directed substantially vertically downwards from the transport plane $E_{H2}$, whose impact surface is oriented in the direction of the suspended fish, is arranged in transport direction T, downstream of the conveying device for transport of the fish in a lying position and alongside the transport path $T_H$ of the suspended conveying device.

22. A fish processing machine, comprising a transporting station for transporting the fish in a region of a fish processing station and at least one fish processing station, wherein the transporting station is designed and configured according to claim 1, wherein the fish processing station is arranged in a region of the suspended position of the fish.

23. The fish processing machine (47) according to claim 22, wherein the fish processing machine is designed and configured for heading unslaughtered and/or slaughtered fish with opened abdominal cavities utilizing a heading apparatus.

24. The fish processing machine according to claim 23, wherein the heading apparatus comprises a separating device for separating the body of fish suspended by the head, wherein the separating device comprises a pair of rotatably drivable circular knives and the circular knives are arranged in a V-shape to each other on opposing sides of the transport path $T_H$.

25. The fish processing machine according to claim 23, wherein a measuring device for detecting and/or determining a position of the collar bones of each suspended fish is arranged in transport direction T downstream of the conveying device and upstream of the heading apparatus in the transport path $T_H$ of the suspended conveying device.

26. The fish processing machine (47) according to claim 23, wherein a pectoral fin capturing device for capturing pectoral fins is arranged in transport direction T downstream of the conveying device for transport of the fish in a lying position and upstream of the heading apparatus in the transport path $T_H$ of the suspended conveying device.

27. A method for transporting fish transverse to their longitudinal extent in transport direction T, comprising:
individually placing the fish on a rotationally driven transport element of a conveying device for transporting the fish in a lying position along a transport path $T_L$,
transporting the fish along the transport path $T_L$ from an entry region E of the conveying device to an exit region A of the conveying device,
wherein the fish are transferred automatically from the lying position to a suspended position by a change-over device, wherein the fish are gripped by the conveying device using the change-over device along the transport path $T_L$ and are brought into the suspended position while being transported along a transport path $T_H$.

28. The method according to claim 27, wherein the fish is transported abdomen-first in transport direction T, with the spine on webs extending transverse to the transport direction T of a conveyor belt of the transport element and with the head resting on an abutment element assigned to the conveyor belt, wherein fish-size-relevant data, that includes thickness of the head perpendicular to the transport plane $E_H$ spanned by the conveyor belt and/or a width of the head in the transport plane $E_H$ in transport direction T are recorded and/or determined in a section I of the conveyor belt by a measuring device.

29. The method according to claim 28, wherein the position of an axis of symmetry of the head is determined based on the thickness of the head.

30. The method according to claim 28, wherein the fish is fed in a section II of the conveyor belt to a gripping device which grips the fish by the head, wherein the position of the head perpendicular to the gripping device is adjusted by a height adjustment of the section II of the conveyor belt dependent on the data recorded and/or determined by the measuring device, such that in a region of the gripping device the fish head is located in the same plane as in the region of the measuring device.

31. The method according to claim 28, wherein the fish run with their fish head onto a take-up element for recording and/or determining the fish-size-relevant data in such a way that the fish head is raised in relation to the transport plane $E_H$.

32. The method according to claim 31, wherein the fish in the region of the gripping device also run onto a corresponding take-up element such that the fish lie with their head in the same plane in the region of the gripping device as in the region of the measuring device.

33. The method according to claim 27, wherein a spike body for gripping the fish head by the lower jaw on the ventral side and by the upper jaw on the dorsal side, in each case penetrates the fish head, by moving two gripping arms of the gripping device from a release position into a holding position.

34. The method according to claim 33, wherein, during transportation along the transport path $T_L$ from section I to section II of the conveyor belt, the fish are positioned from below between the gripping arms located in the release position, said gripping arms being moved from above in the vertical plane EV in the direction of the conveyor belt.

35. The method according to claim 33, wherein the gripping arms are moved towards each other in the vertical plane EV such that a rigid spike body with a single spike completely penetrates through the head of the fish from the dorsal side, while a second, rotatably supported spike body with at least two spikes penetrates into the head from the ventral side.

36. The method according to claim 35, wherein the transport speed of the conveyor belt is varied dependent on the recorded and/or determined data, that includes a width of the head in the transport plane $E_H$ in transport direction T, when a fish is located in the region of the gripping device in such a way that a rotatable spike body with at least two spikes meets the fish head at the same time as or chronologically before a rigid spike body.

37. The method according to claim 36, wherein the transport speed of the conveyor belt is varied when a fish is located in the exit region A of the conveying device in such a way that the conveyor belt or the webs arranged thereon are prevented from colliding with swinging fish, wherein changes in the transport speed are coordinated with each other on gripping of the fish on the one hand, and on swinging down of the fish on the other hand, by the partitioning of the conveyor belt.

38. The method according to claim 27, wherein each gripping device along a suspended conveying device of the change-over device in a plane EV, which is oriented perpendicular to the transport plane $E_H$, is transported beyond the transport path $T_L$ of the conveying device along the transport path $T_H$, such that the fish gripped by the head pivot into the suspended position after leaving the conveying device.

* * * * *